(12) United States Patent
Leger

(10) Patent No.: US 11,090,709 B1
(45) Date of Patent: Aug. 17, 2021

(54) MULTIPLE DIE SET SWAGE MACHINE SYSTEMS AND METHODS

(71) Applicant: Trinity Bay Equipment Holdings, LLC, Houston, TX (US)

(72) Inventor: John Paul Leger, Baytown, TX (US)

(73) Assignee: Trinity Bay Equipment Holding, LLC, Houston, TX (US)

( * ) Notice: Subject to any disclaimer, the term of this patent is extended or adjusted under 35 U.S.C. 154(b) by 0 days.

(21) Appl. No.: 17/109,214

(22) Filed: Dec. 2, 2020

(51) Int. Cl.
*B21D 39/04* (2006.01)
*F16L 13/14* (2006.01)
*B21D 37/10* (2006.01)

(52) U.S. Cl.
CPC ........... *B21D 39/046* (2013.01); *B21D 39/04* (2013.01); *B21D 39/048* (2013.01); *F16L 13/146* (2013.01); *B21D 37/10* (2013.01); *Y10T 29/53996* (2015.01)

(58) Field of Classification Search
CPC ...... B21D 37/10; B21D 39/04; B21D 39/046; B21D 39/048; Y10T 29/53996
See application file for complete search history.

(56) References Cited

U.S. PATENT DOCUMENTS

| | | | | |
|---|---|---|---|---|
| 4,057,882 A | * | 11/1977 | Bowmer | B21F 15/06 29/283.5 |
| 4,418,458 A | * | 12/1983 | Hunter | B21D 39/04 29/237 |
| 8,631,553 B2 | | 1/2014 | Gleim | |
| 8,782,863 B2 | * | 7/2014 | Pfeiffer | B25B 27/10 29/237 |

* cited by examiner

*Primary Examiner* — Jermie E Cozart
(74) *Attorney, Agent, or Firm* — Conrad J. Hsu

(57) ABSTRACT

Techniques for implementing and/or operating a system that includes a swage machine and a pipe fitting to be secured to a pipe segment. The pipe fitting includes a fitting jacket to be conformally deformed around tubing of the pipe segment. The swage machine includes a grab plate that interlocks with the pipe fitting; a die seat implemented in a die plate of the swage machine; a die set loaded in the die seat, in which the die set is to be passed over the fitting jacket of the pipe fitting to facilitate conformally deforming the fitting jacket; another die seat implemented farther from the grab plate than the die seat; and another die set loaded in the other die seat, in which the other die set is to be passed over the fitting jacket of the pipe fitting to facilitate conformally deforming the fitting jacket.

13 Claims, 10 Drawing Sheets

US 11,090,709 B1

MULTIPLE DIE SET SWAGE MACHINE SYSTEMS AND METHODS

BACKGROUND

The present disclosure generally relates to pipeline systems and, more particularly, to special-purpose deployment equipment—namely a swage machine—that may be implemented and/or operated to facilitate securing a pipe fitting to one or more pipe segments deployed or to be deployed in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to one or more pipe (e.g., midline and/or end) fittings (e.g., connectors), for example, which are used to fluidly couple a pipe segment to another pipe segment, to a fluid source, and/or to a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid.

Additionally, in some instances, a pipe fitting may be implemented to be secured to a pipe segment via swaging techniques, which conformally deform a portion of the pipe fitting around the tubing of the pipe segment such that the portion of the pipe fitting engages the pipe segment tubing. In fact, in some such instances, special-purpose deployment equipment—namely a swage machine—may be implemented and/or operated to facilitate swaging (e.g., conformally deforming) the portion of the pipe fitting around the pipe segment tubing. In particular, the swage machine may include a grab plate, which is implemented to matingly interlock with a grab ring on the pipe fitting to facilitate securing the swage machine to the pipe fitting, and a die plate, which is implemented to enable a set of one or more dies to be loaded therein such that the shape of the die set facilitates conformally deforming the portion of the pipe fitting inwardly in a radial direction when passed thereover in an axial direction. However, at least in some such instances, multiple different die sets may be used to swage a pipe fitting and, thus, may be selectively loaded into the die plate of a swage machine, which, at least in some instances, may potentially limit the efficiency with which a swage machine can secure a pipe fitting to a pipe segment, for example, due to a swaging process being paused to enable different die sets to be swapped into the die plate.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a swage machine and a pipe fitting to be secured to a pipe segment. The pipe fitting includes a fitting jacket to be conformally deformed around tubing of the pipe segment that defines a pipe bore and a fluid conduit implemented in a tubing annulus of the tubing to facilitate securing the pipe fitting to the pipe segment. The swage machine includes a grab plate that matingly interlocks with the pipe fitting to facilitate securing the swage machine to the pipe fitting; a first die seat implemented in a die plate of the swage machine; a first die set loaded in the first die seat of the swage machine, in which the first die set is to be passed over the fitting jacket of the pipe fitting to facilitate conformally deforming the fitting jacket around the tubing of the pipe segment; a second die seat implemented farther from the grab plate of the swage machine than the first die seat; and a second die set loaded in the second die seat of the swage machine, in which the second die set is different from the first die set and is to be passed over the fitting jacket of the pipe fitting to facilitate conformally deforming the fitting jacket around the tubing of the pipe segment.

In another embodiment, a method of implementing a swage machine that includes implementing a grab plate with a grab tab that matingly interlocks with a grab notch on a grab ring of pipe fitting to be swaged by the swage machine to facilitate securing the swage machine to the pipe fitting; implementing a first die seat in a die plate of the swage machine to enable a first die set that is be used to facilitate swaging a fitting jacket of the pipe fitting to be loaded in the swage machine; implementing a second die seat farther from the grab plate of the swage machine than the first die seat to enable a second die set that is to be used to facilitate swaging the fitting jacket of the pipe fitting to be loaded in the swage machine while the first die set is concurrently loaded in the first die seat of the swage machine; and securing a swaging actuator to the die plate of the swage machine to enable the swage machine to swage the pipe fitting at least in part by operating the swaging actuator to cause the die plate and the grab plate of the swage machine to move toward one another.

In another embodiment, a swage machine includes a grab plate with a grab tab, in which the grab tab matingly interlocks with a grab notch on a grab ring of a pipe fitting to be swaged by the swage machine to facilitate securing the swage machine to the pipe fitting; a preceding die seat implemented in a die plate of the swage machine, in which the preceding die seat enables a preceding die set that is to be used to facilitate swaging the pipe fitting to be loaded in the swage machine such that a first outer surface of the preceding die set directly abuts a first inner surface of the preceding die seat; a subsequent die seat that enables a subsequent die set that is to be used to facilitate swaging the pipe fitting to be loaded in the swage machine such that a second outer surface of the subsequent die set directly abuts a second inner surface of the subsequent die seat while the preceding die set is concurrently loaded in the preceding die seat of the swage machine, in which the preceding die seat is implemented closer to the grab plate of the swage machine than the subsequent die seat; and a swaging actuator secured to the die plate of the swage machine, in which the swage machine swages the pipe fitting at least in part by operating the swaging actuator to cause the die plate and the grab plate of the swage machine to move toward one another.

DETAILED DESCRIPTION

Figure 1:
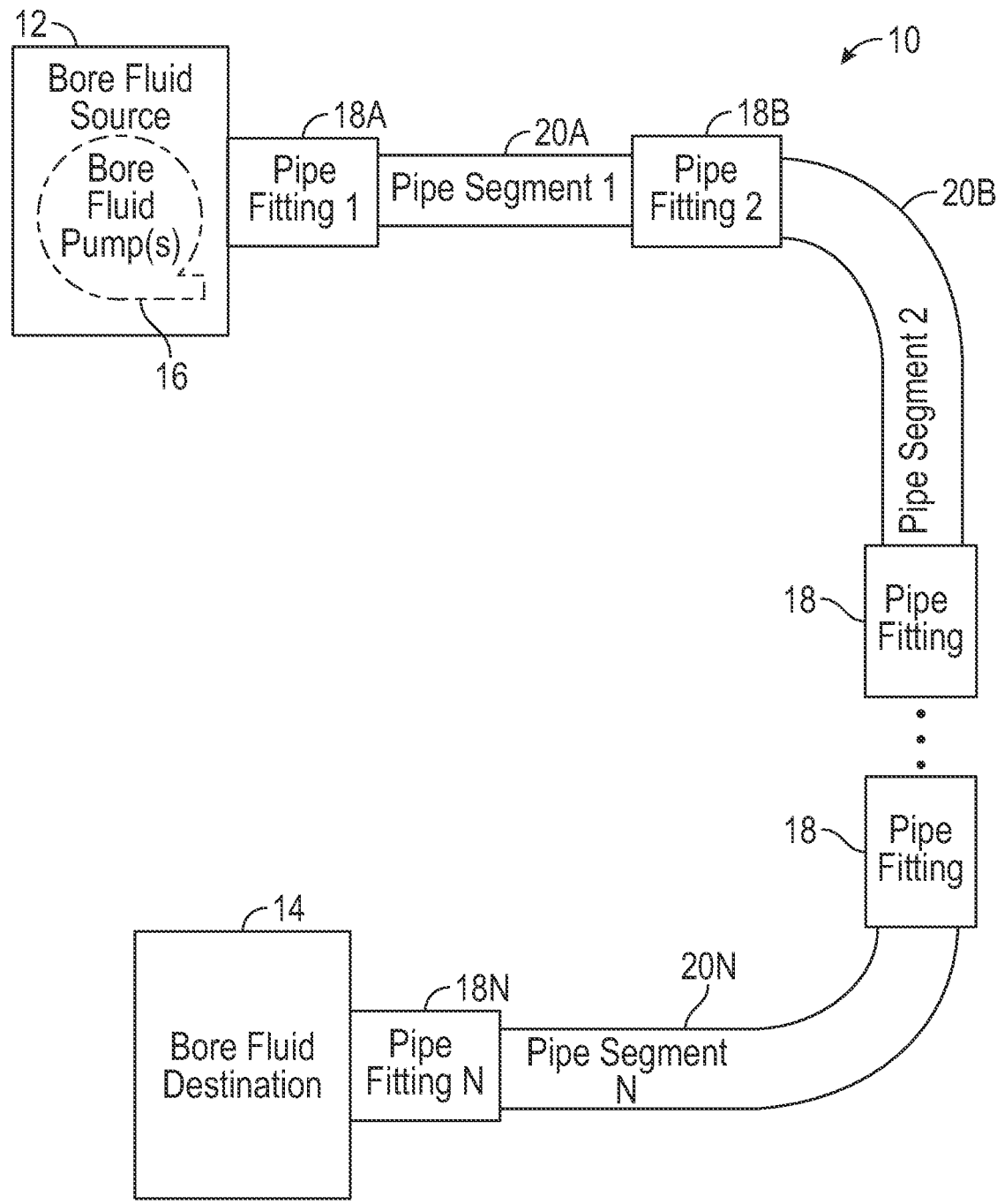
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, to enable fluid flow therethrough, a pipe fitting generally includes a fitting bore, which is defined (e.g., enclosed) by a fitting tube. Additionally, in some instances, the pipe fitting may be secured to a pipe segment at least in part by securing the tubing of the pipe segment around the fitting tube of the pipe fitting using swaging techniques. To facilitate securing a pipe segment thereto via swaging techniques, the pipe fitting may include one or more fitting jackets implemented circumferentially around its fitting tube. When implemented in this manner, the pipe fitting may be secured to the pipe fitting via swaging techniques at least in part by disposing (e.g., inserting) the tubing of the pipe segment in a tubing cavity of the pipe fitting, which is defined (e.g., enclosed) between a corresponding fitting jacket and the fitting tube, and conformally deforming the fitting jacket around the pipe segment tubing such that an inner surface of the fitting jacket and/or an outer surface of the fitting tube engage corresponding surfaces of the pipe segment tubing.

To facilitate enabling the engagement between a pipe fitting and pipe segment tubing to secure the pipe fitting to a corresponding pipe segment, the pipe fitting may be implemented using a relatively rigid material. For example, a fitting jacket of the pipe fitting may be implemented using metal, such as carbon steel, stainless steel, duplex stainless steel, and/or super duplex stainless steel. As such, to facilitate improving swaging efficiency, in some instances, special-purpose deployment equipment—namely a swage machine—may be implemented and/or operated to facilitate conformally deforming a fitting jacket of a pipe fitting around pipe segment tubing.

In particular, to facilitate conformally deforming a fitting jacket of a pipe fitting around pipe segment tubing, a swage machine may include a grab plate and a die plate, for example, in addition to a support plate. More specifically, the grab plate of the swage machine may include a grab tab, which is implemented (e.g., sized and/or shaped) to matingly interlock (e.g., engage and/or interface) with a grab notch implemented on a grab ring of the pipe fitting to facilitate securing the swage machine to the pipe fitting. Additionally, the die plate of the swage machine may be implemented to enable a set of one or more dies to be loaded therein such that the shape of the die set deforms a fitting jacket of the pipe fitting inwardly in a radial direction when the passed over the fitting jacket in an axial direction.

However, at least in some instances, different die sets may be used to swage a pipe fitting. In particular, due to the fitting jacket of a pipe fitting being implemented using relatively rigid material, to secure the pipe fitting to pipe segment tubing disposed therein, in some instances, the swage machine may perform multiple swaging passes to incrementally deform the fitting jacket. For example, during an initial (e.g., first and/or preceding) swaging pass, a swage machine may swage the fitting jacket around the pipe segment tubing using a first (e.g., initial and/or preceding) die set, which has a larger ending inner surface diameter. To facilitate securing the pipe fitting to the pipe segment tubing, the swage machine may then swage the fitting jacket of the pipe fitting around the pipe segment tubing using a second (e.g., subsequent) die set, which has a smaller ending inner surface diameter, during a subsequent swaging pass. However, at least in some instances, pausing a swaging process between successive swaging passes to swap out die sets loaded in a swage machine may potentially limit the efficiency with which the swage machine secures a pipe fitting to a pipe segment and, thus, deployment efficiency of a pipeline system in which the pipe fitting and the pipe segment are to be deployed.

Accordingly, to facilitate improving pipeline deployment efficiency, the present disclosure provides techniques for implementing and/or operating special-purpose deployment equipment—namely a swage machine—that enables multiple different die sets to be concurrently loaded (e.g., installed) therein. As will be described in more detail below, to enable multiple die sets to be concurrently loaded therein, the swage machine may be implemented with multiple die seats, which each enable a die set to be loaded therein such that an outer surface of the die set directly abuts the inner surface of the die seat. For example, the swage machine may include a first die seat, which is implemented to enable a first die set to be loaded therein, and a second die seat, which is implemented to enable a second (e.g., different) die set to be loaded therein.

In particular, to enable multiple different die sets to be concurrently loaded therein, in some embodiments, a swage machine may include multiple die seats implemented in its die plate. For example, in some such embodiments, the die plate of the swage machine may include a first (e.g., preceding) die seat, which is implemented closer to the grab plate of the swage machine, and a second (e.g., subsequent) die seat, which is implemented farther from the grab plate of the swage machine. Additionally or alternatively, to enable multiple die sets to be concurrently loaded therein, in some embodiments, a swage machine may include multiple die plates, which each includes one or more die seats implemented therein. For example, in some such embodiments, a first (e.g., preceding) die seat may be implemented in a first (e.g., preceding) die plate, which is closer to the grab plate of the swage machine, and a second (e.g., subsequent) die seat may be implemented in a second (e.g., subsequent) die plate, which is farther from the grab plate of the swage machine.

In any case, in some embodiments, a swage machine may perform a swaging operation (e.g., pass) while each of multiple die sets loaded therein directly abuts a corresponding die seat. In particular, in some such embodiments, a first (e.g., preceding) die set, which is loaded in a first die seat that is implemented closer to the grab plate of the swage machine, may have a larger ending inner surface diameter as compared to a second (e.g., subsequent) die set, which is loaded in a second die seat that is implemented farther from the grab plate. In fact, in some embodiments, implementing a swage machine in this manner may enable the swage machine to secure a pipe fitting to the tubing of a pipe segment via a single swaging pass. Moreover, in some such embodiments, the starting inner surface diameter of the second (e.g., subsequent) die set may be larger than the ending inner surface diameter of the first (e.g., preceding) die set, thereby producing a relief section at the junction therebetween that enables the pipe fitting to expand out slightly after passing the first die set, which, at least in some instances, may facilitate reducing the force sufficient to cause the second die set to pass over the pipe fitting, for example, to enable the swage machine to secure the pipe fitting to pipe segment tubing via a single swaging pass.

However, in other embodiments, when each die set directly abuts a corresponding die seat, the ending inner surface diameter of a second (e.g., subsequent) die set, which is loaded in a second die seat that is implemented farther from the grab plate of the swage machine, may have an ending inner surface diameter that is greater than or equal to the ending inner surface diameter of a first (e.g., preceding) die set, which is loaded in a first die seat that is implemented closer to the grab plate. In other words, when the die plate of the swage machine is passed over a pipe fitting while each die set loaded therein directly abuts a corresponding die seat, in such embodiments, the pipe fitting may primarily be swaged (e.g., deformed) by the first die set. Thus, to swage the pipe fitting using the second die set, the swage machine may be implemented to enable selectively activating the second die set at least in part by causing the ending inner surface diameter of the second die set to be smaller than the ending inner surface diameter of the first die set.

To enable selectively activating a die set loaded therein, in some embodiments, a swage machine may additionally include a wedged activation assembly. In particular, the wedged activation assembly may include a wedged activation collar, which has a female taper that is implemented to be selectively inserted between a die seat implemented in a die plate of the swage machine and the male taper of a die set loaded in the die seat, and one or more activation actuators, which are secured to the wedged activation collar. As such, to facilitate reducing the ending inner surface diameter of the die set, the swage machine may operate one or more activation actuators of the wedged activation assembly to insert more of the wedged activation collar between the die set and its corresponding die seat. In other words, in some such embodiments, the die set may be its activated state when the wedged activation collar of the wedged activation assembly is fully inserted between the die set and its corresponding die seat and in its deactivated state when the wedged activated collar is not fully inserted (e.g., at least partially withdrawn from) between the die set and its corresponding die seat.

As described above, in some embodiments, during an initial swaging pass, a swage machine may swage (e.g., deform) a pipe fitting that is secured to its grab plate primarily using a first (e.g., initial and/or preceding) die set, which is loaded in a first die seat that is closer to the grab plate than a second die seat in which a second (e.g., subsequent) die set is loaded. Thus, in such embodiments, the swage machine may use its wedged activation assembly to maintain the second die set in its deactivated state during the initial swaging pass. To enable swaging the pipe fitting using the second die set, the swage machine may then use its wedged activation assembly to transition the second die set from its deactivated state to its activated state after the initial swaging pass and maintain the second die in its activated state during a subsequent swaging pass. In this manner, as will be described in more detail below, the present disclosure provides techniques for implementing and/or operating special-purpose deployment equipment—namely a swage machine—that enables multiple different dies sets to be concurrently loaded therein, which, at least in some instances, may facilitate improving the efficiency with which the swage machine secures a pipe fitting to a pipe segment and, thus, deployment efficiency of a pipeline system in which the pipe fitting and the pipe segment are to be deployed, for example, at least in part by obviating a pause between success swaging passes in a swaging process to swap out die sets.

To help illustrate, an example of a pipeline system 10 is shown in FIG. 1. As depicted, the pipeline system 10 is coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., one or two) pipe segments 20 or more than three (e.g., four, five, or more) pipe segment 20. Additionally or alternatively, in other embodiments, a pipeline system 10 may include fewer than five (e.g., one, two, three, or four) pipe fittings 18 or more than five (e.g., six, seven, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, at least in part by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
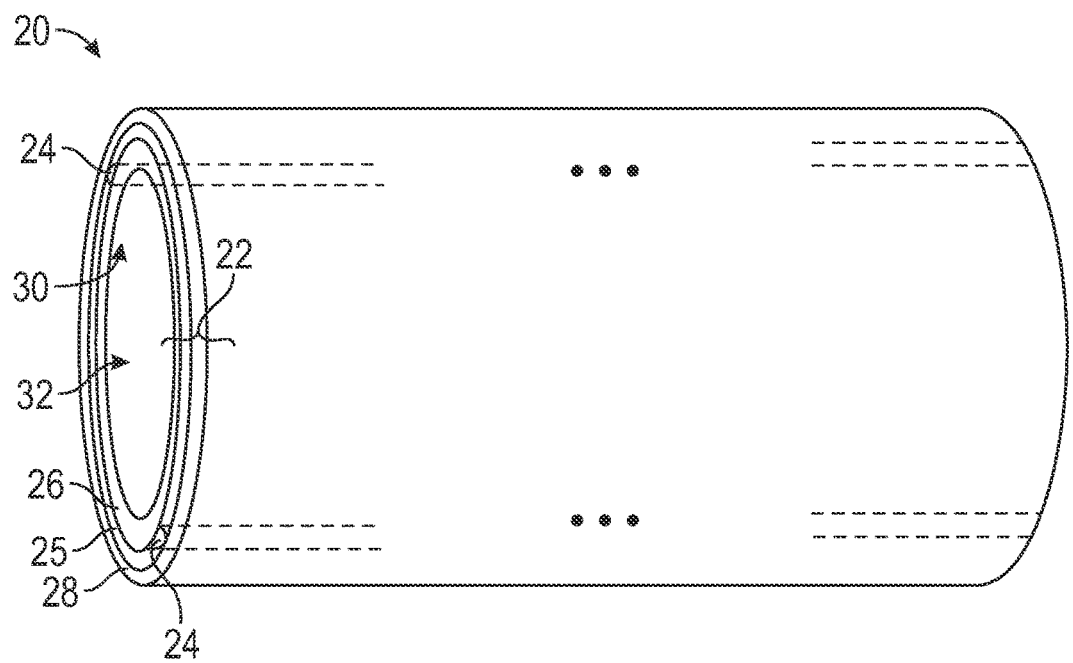
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in a tubing annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate (e.g., reinforcement) layers of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, as compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer than two (e.g., one) or more than two (e.g., three, four, or more) fluid conduits 24 defined in its tubing annulus 25. Additionally, in other embodiments, a fluid conduit 24 defined in a tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
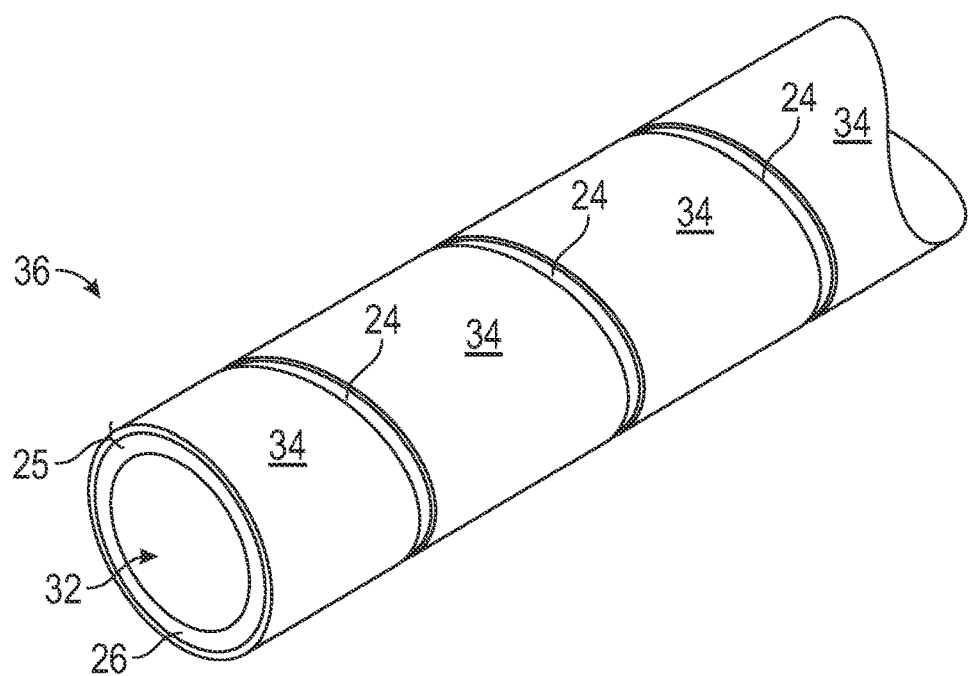
FIG. 3 is a perspective view of an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate (e.g., reinforcement) layer 34 included in a tubing annulus 25 of its pipe segment tubing 22, is shown in FIG. 3. In some embodiments, one or more intermediate layers 34 of the pipe segment tubing 22 may be implemented using composite material and/or metal, such as carbon steel, stainless steel, duplex stainless steel, super duplex stainless steel, or any combination thereof. In other words, at least in some such embodiments, an intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a solid strip of material around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, to facilitate flowing fluid from a bore fluid source 12 to a bore fluid destination 14, as described above, one or more pipe fittings 18, such as a midline pipe fitting 18 and/or a pipe end fitting 18, may be secured to a pipe segment 20. In particular, as described above, in some instances, a pipe fitting 18 may be secured to a pipe segment 20 using swaging techniques, which conformally deform a fitting jacket of the pipe fitting 18 around the tubing 22 of the pipe segment 20 such that an inner surface of the fitting jacket and/or an outer surface of the fitting tube 44 engage corresponding surfaces of the pipe segment tubing 22. To enable the engagement between the pipe fitting and the pipe segment tubing 22 to secure the pipe fitting 18 to a corresponding pipe segment 20, the pipe fitting may be implemented using a relatively rigid material, such as carbon steel, stainless steel, duplex stainless steel, and/or super duplex stainless steel. As such, to facilitate deforming the relatively rigid material, in some embodiments, special-purpose deployment equipment—namely a swage machine—may be implemented and/or operated to facilitate swaging a pipe fitting 18 around a pipe segment 20 during deployment of a pipeline system 10.

Figure 4:
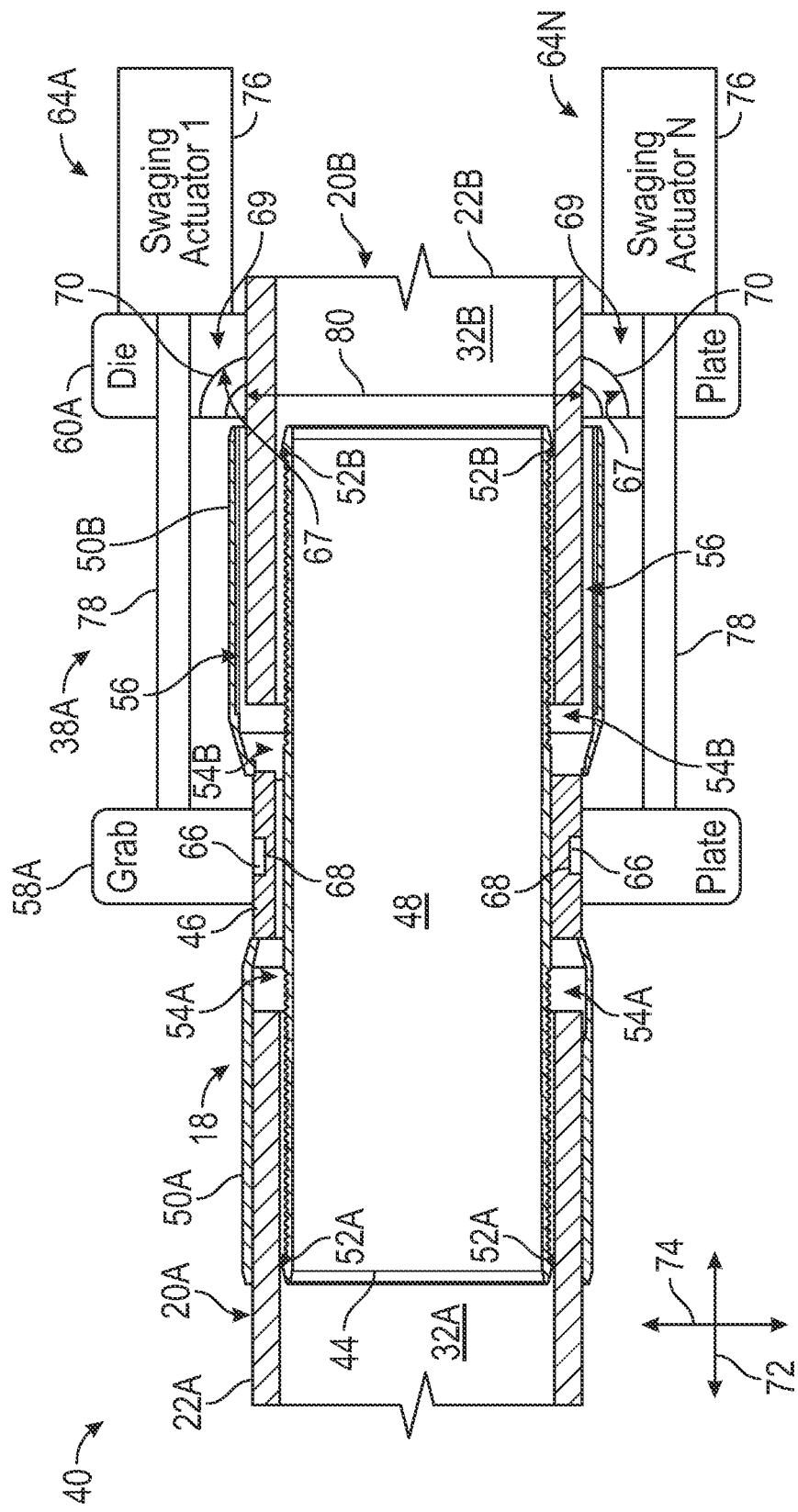
FIG. 4 is an axial cross-section profile of an example of a portion of the pipeline system of FIG. 1 and a swage machine, in accordance with an embodiment of the present disclosure.

To help illustrate, an example cross-section of a swage machine 38A and a portion 40 of a pipeline system 10 is shown in FIG. 4. As depicted, the portion 40 of the pipeline system 10 includes a first pipe segment 20A, a second pipe segment 20B, and a pipe fitting 18, which is coupled between the first pipe segment 20A and the second pipe segment 20B. Additionally, as depicted, the pipe fitting 18 includes a fitting tube 44 and a grab ring 46, which is implemented around the fitting tube 44. In particular, as depicted, the fitting tube 44 defines (e.g., encloses) a fitting bore 48, which is fluidly coupled to a first pipe bore 32A of the first pipe segment 20A and a second pipe bore 32B of the second pipe segment 20B.

In other words, the pipe fitting 18 in FIG. 4 may be a midline pipe fitting 18. However, it should be appreciated that the depicted example is merely intended to be illustrative and not limiting. In particular, in other embodiments, the techniques described in the present disclosure may additionally or alternatively be used with other types of pipe fittings 18, such as a pipe end fitting 18.

In any case, as depicted, the pipe fitting 18 includes fitting jackets 50—namely a first fitting jacket 50A and a second fitting jacket 50B—and fitting seals 52—namely a first fitting seal 52A and a second fitting seal 52B—implemented circumferentially around the fitting tube 44. In particular, as depicted, first tubing 22A of the first pipe segment 20A is disposed in a first tubing cavity 54A of the pipe fitting 18, which is defined between the first fitting jacket 50A and the fitting tube 44. Similarly, second tubing 22B of the second pipe segment 20B is disposed in a second tubing cavity 54B of the pipe fitting 18, which is defined between the second fitting jacket 50B and the fitting tube 44.

However, as depicted, open space 56 is present between the second tubing 22B of the second pipe segment 20B and the second fitting jacket 50B of the pipe fitting 18 whereas minimal open space is present between the first tubing 22A of the first pipe segment 20A and the first fitting jacket 50A of the pipe fitting 18. As such, the pipe fitting 18 may exert more resistance to tubing movement in the first tubing cavity 54A and, thus, facilitate securing the pipe fitting 18 to the first pipe segment 20A, for example, in addition to sealing the first tubing 22A of the first pipe segment 20A via the first fitting seal 52A. On the other hand, the pipe fitting 18 may exert less resistance to tubing movement in the second tubing cavity 54B, which, at least in some instances, may enable the second tubing 22B of the second pipe segment 20B to move relatively freely into and/or out from the second tubing cavity 54B of the pipe fitting 18. As such, to facilitate securing the pipe fitting 18 to the second pipe segment 20B and sealing the second pipe segment tubing 22B in the pipe fitting 18 via the second fitting seal 52B, the swage machine 38 may be operated to conformally deform (e.g., swage) the second fitting jacket 50B around the second tubing 22B of the second pipe segment 20B, thereby consuming at least a portion (e.g., majority) of the open space 56.

To facilitate conformally deforming a fitting jacket 50 around pipe segment tubing 22, as depicted, the swage machine 38A includes a grab plate 58A and a die plate 60A. In particular, as depicted, the grab plate 58A of the swage machine 38A includes a grab tab 66, which is implemented (e.g., sized and/or shaped) to matingly interlock (e.g., engage and/or interface) with a grab notch 68 on the grab ring 46 of the pipe fitting 18. In other words, the grab plate 58A may be implemented to facilitate securing the swage machine 38A to the pipe fitting 18.

Additionally, as depicted, the die plate 60A of the swage machine 38A includes a die seat 67 that is implemented to enable a die set 69, which includes one or more dies segments 70, to be loaded therein. In particular, as depicted, the die set 69 is loaded into the die plate 60A such that the outer surface of the die set 69 directly abuts the inner surface of the die seat 67 and the die set 69 opens toward the grab plate 58A of the swage machine 38A. As such, when compressed against a fitting jacket 50 of the pipe fitting 18 in an axial direction 72 toward the grab plate 58A, the shape of the die set 69 may compress the fitting jacket 50 inwardly in a radial direction 74, for example, such that the fitting jacket 50 and pipe segment tubing 22 disposed in a corresponding tubing cavity 54 are conformally deformed. In fact, in some embodiments, a die plate 60 of a swage machine 38 may be implemented to enable different die sets 69 to be selectively loaded therein, for example, during successive swaging passes (e.g., cycles) and/or depending on characteristics, such as diameter and/or material thickness, of a fitting jacket 50.

To facilitate compressing a die set 69 loaded in its die plate 60 against a fitting jacket 50 in an axial direction 72, as in the depicted example, a swage machine 38 may include one or more swaging actuators 64. In particular, in the depicted example, the swage machine 38A include a first swaging actuator 64A and an Nth swaging actuator 64N. In some embodiments, one or more swaging actuators 64 of a swage machine 38 may each be a fluid actuator, such as a hydraulic actuator or a pneumatic actuator. In any case, as depicted, each swaging actuator 64 of the swage machine 38A includes an actuator cylinder 76 and an actuator piston 78, which may selectively extend out from the actuator cylinder 76 based at least in part on the supply of fluid (e.g., liquid and/or gas) to the actuator cylinder 76 and/or selectively retract into the actuator cylinder 76 based at least in part on the extraction of fluid from the actuator cylinder 76.

In particular, in the depicted example, the actuator cylinder 76 of each swaging actuator 64 in the swage machine 38A is secured to the die plate 60A of the swage machine 38A. Additionally, in the depicted example, the actuator piston 78 of each swaging actuator 64 extends through the die plate 60A and is secured to the grab plate 58A of the swage machine 38A. As such, to facilitate performing a swaging operation (e.g., pass), the swage machine 38A may operate one or more of its swaging actuators 64 to pull the grab plate 58A toward the die plate 60A via one or more reverse (e.g., retracting) strokes such that the second fitting jacket 50B of the pipe fitting 18 secured to the grab plate 58A moves through the die set 69 loaded in the die plate 60A. On the other hand, the swage machine 38A may operate one or more of its swaging actuators 64 to push the grab plate 58A away from the die plate 60A via one or more forward (e.g., extending) strokes, for example, to facilitate loading a die set 69 in the die plate 60A and/or resetting the position of the die plate 60A for the performance of a subsequent swaging operation (e.g., pass). In this manner, a swage machine 38 may be implemented and/or operated to facilitate swaging (e.g., conformally deforming) a fitting jacket 50 of a pipe fitting 18 around the tubing 22 of a pipe segment such that the pipe segment tubing 22 is secured and sealed in the pipe fitting 18.

However, as described above, at least in some instances, multiple different die sets 69 may be used to swage a pipe fitting 18. In particular, due to the fitting jacket 50 of a pipe fitting 18 being implemented using a relatively rigid material, to secure the pipe fitting 18 to pipe segment tubing 22 disposed therein, in some instances, multiple swaging passes may be performed on the fitting jacket 50 to incrementally deform the fitting jacket 50. For example, during an initial (e.g., first and/or preceding) swaging pass, a swage machine 38 may swage the fitting jacket 50 around the pipe segment tubing 22 using a first (e.g., initial and/or preceding) die set 69, which has a larger ending inner surface diameter 80. To facilitate securing the pipe fitting 18 to the pipe segment tubing 22, during a subsequent swaging pass, the swage machine 38 may then swage the fitting jacket 50 of the pipe fitting 18 around the pipe segment tubing 22 using a second (e.g., subsequent) die set, which has a smaller ending inner surface diameter 80.

However, at least in some instances, pausing a swaging process between successive swaging passes to swap out die sets 69 loaded in the swage machine 38A may potentially limit the efficiency with which the swage machine 38A secures a pipe fitting 18 to a pipe segment 20 and, thus, deployment efficiency of a pipeline system 10 in which the pipe fitting 18 and the pipe segment 20 are to be deployed. Accordingly, to facilitate improving pipeline deployment efficiency, the present disclosure provides techniques for implementing and/or operating a swage machine 38 that enables multiple different die sets 69 to be concurrently loaded therein. In particular, as will be described in more detail below, at least in some instances, concurrently loading multiple different die sets in a swage machine 38 may obviate a die swap between successive swaging passes in a swaging process and, thus, facilitate improving the efficiency with which a pipe fitting 18 is secured to a pipe segment 20.

Figure 5:
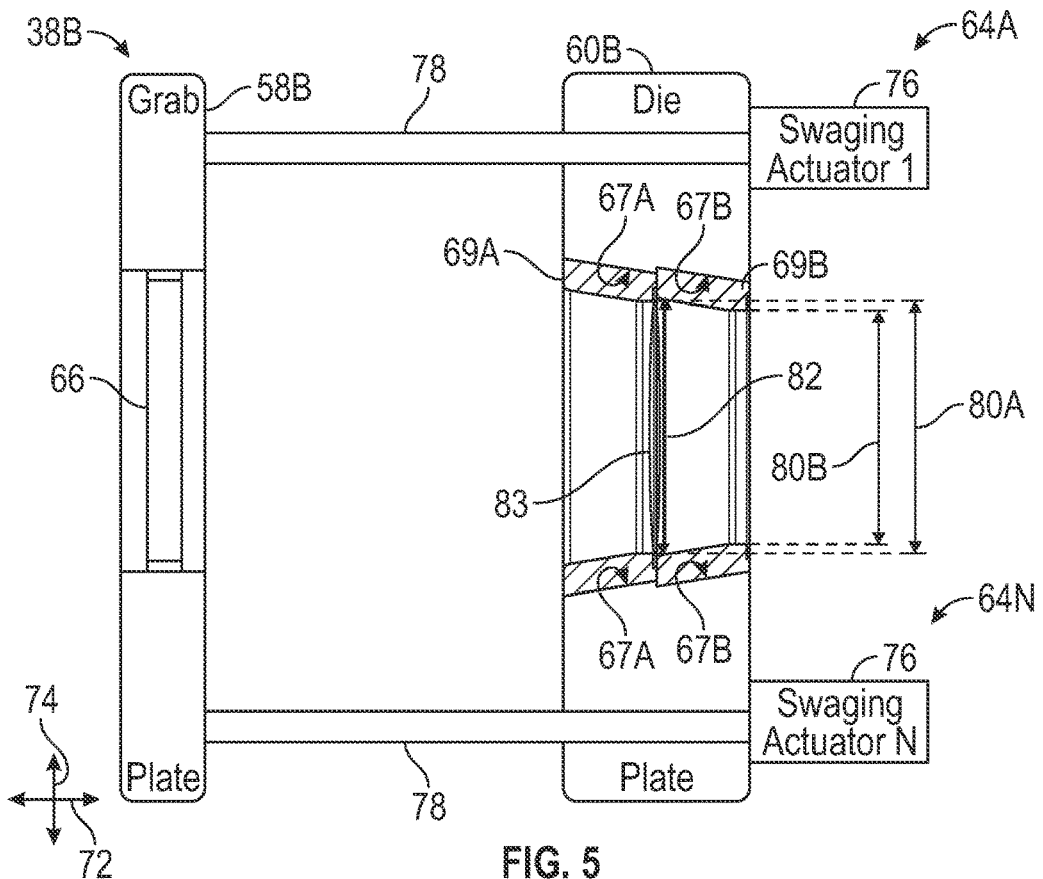
FIG. 5 is an axial cross-section profile of another example of a swage machine that includes a die plate with multiple different die sets concurrently loaded therein, in accordance with an embodiment of the present disclosure.

To help illustrate, another example cross-section of a swage machine 38B is shown in FIG. 5. To facilitate conformally deforming a fitting jacket 50 of a pipe fitting 18 around the tubing 22 of a pipe segment 20, as depicted, the swage machine 38B includes a grab plate 58B, a die plate 60B, and swaging actuators 64—namely a first swaging actuator 64A and an Nth swaging actuator 64N. In particular, as depicted, the grab plate 58B includes a grab tab 66, which may be implemented (e.g., sized and/or shaped) to matingly interlock (e.g., engage and/or interface) with a grab notch 68 on the grab ring 46 of a pipe fitting 18 to facilitate securing the swage machine 38B to the pipe fitting 18. In fact, in some embodiments, the grab plate 58B of the swage machine 38B in FIG. 5 may generally match the grab plate 58A of the swage machine 38A in FIG. 4

Additionally, as described above, in some embodiments, one or more swaging actuators 64 of a swage machine 38 may each be a fluid actuator, such as a hydraulic actuator or a pneumatic actuator. In other words, in some such embodiments, the first swaging actuator 64A and the Nth swaging actuator 64N of the swage machine 38B may each be a hydraulic actuator or a pneumatic actuator. In any case, as depicted, each swaging actuator 64 of the swage machine 38B includes an actuator cylinder 76 and an actuator piston 78, which may selectively extend out from the actuator cylinder 76 based at least in part on the supply of fluid (e.g., liquid and/or gas) to the actuator cylinder 76 and/or selectively retract into the actuator cylinder 76 based at least in part on the extraction of fluid from the actuator cylinder 76.

In particular, similar to FIG. 4, as depicted in FIG. 5, the actuator cylinder 76 of each swaging actuator 64 in the swage machine 38B is secured to the die plate 60B of the swage machine 38B. Additionally, as depicted in FIG. 5, the actuator piston 78 of each swaging actuator 64 extends through the die plate 60B and is secured to the grab plate 58B of the swage machine 38B. As such, similar to FIG. 4, to facilitate performing a swaging operation (e.g., pass), the swage machine 38B of FIG. 5 may operate one or more of its swaging actuators 64 to pull the grab plate 58B toward the die plate 60B via one or more reverse (e.g., retracting) strokes. On the other hand, similar to FIG. 4, the swage machine 38B of FIG. 5 may operate one or more of its swaging actuators 64 to push the grab plate 58B away from the die plate 60B via one or more forward (e.g., extending) strokes, for example, to facilitate loading a die set 69 into the die plate 60B and/or resetting the position of the die plate 60B for the performance of a subsequent swaging pass.

However, as depicted in FIG. 5, multiple die seats 67 are implemented in the die plate 60B of the swage machine 38B to enable multiple die sets 69 to be concurrently loaded therein. In particular, the die plate 60B includes a first (e.g., preceding) die seat 67A, which is implemented closer to the grab plate 58B and to enable a first (e.g., preceding) die set 69A to be loaded therein such the first die set 69A opens toward the grab plate 58B. Additionally, the die plate 60B includes a second (e.g., subsequent) die seat 67B, which is implemented farther from the grab plate 58B and to enable a second (e.g., subsequent) die set 69B to be loaded therein such that the second die set 69B opens toward the grab plate 58B. As such, when compressed against a fitting jacket 50 of the pipe fitting 18 in an axial direction 72 toward the grab plate 58B, the shape of the first die set 69A and/or the shape of the second die set 69B may compress the fitting jacket 50 inwardly in a radial direction 74, for example, such that the fitting jacket 50 and pipe segment tubing 22 disposed in a corresponding tubing cavity 54 are conformally deformed.

To enable the first die set 69A and the second die set 69B to both be used to deform a fitting jacket 50 during the same swaging pass, as in the depicted example, in some embodiments, the first die set 69A, when loaded in the first die seat 67A, may have a larger ending inner surface diameter 80A as compared to the ending inner surface diameter 80B of the second die set 69B that results when the second die set 69B is loaded in the second die seat 67B. Moreover, as in the depicted example, in some embodiments, the ending inner surface diameter 80A of the first die set 69A may be smaller than the starting inner surface diameter 82 of the second die set 69B, thereby producing a relief section 83 at the junction between the first die set 69A and the second die set 69B. In particular, in such embodiments, the relief section 83 may enable a fitting jacket 50 of a pipe fitting 18 to expand outward slightly in a radial direction 74 once it passes through the first die set 69A (e.g., due to material spring back), which, at least in some instances, may facilitate reducing the force sufficient to pass the second die set 69B over the fitting jacket 50, for example, to facilitate enabling the swage machine 38B to secure the pipe fitting 18 to pipe segment tubing 22 via a single swaging pass. In this manner, a swage machine 38 may be implemented to enable multiple different die sets 69 to be concurrently loaded therein, which, at least in some instances, may facilitate improving the efficiency with which the swage machine 38 secures a pipe fitting 18 to a pipe segment 20, for example, at least in part by obviating a pause between successive swaging passes in a swaging process to swap out die sets 69.

However, it should be appreciated that the depicted example is merely intended to be illustrative and not limiting. In particular, in other embodiments, the die plate 60 of a swage machine 38 may include more than two (e.g., three, four, or more) die seats 67 to enable more than two die sets 69 to be concurrently loaded therein. Additionally or alternatively, in other embodiments, a swage machine 38 may include fewer than two (e.g., one) swaging actuators 64 or more than two (e.g., three, four, or more) swaging actuators 64. Furthermore, as will be described in more detail below, in other embodiments, a swage machine 38 may be implemented with multiple die plates 60 to enable multiple die sets 69 to be concurrently loaded therein. Moreover, in other embodiments, a swage machine 38 may be implemented to enable one or more die sets 69 concurrently loaded therein to be selectively activated.

Figure 6:
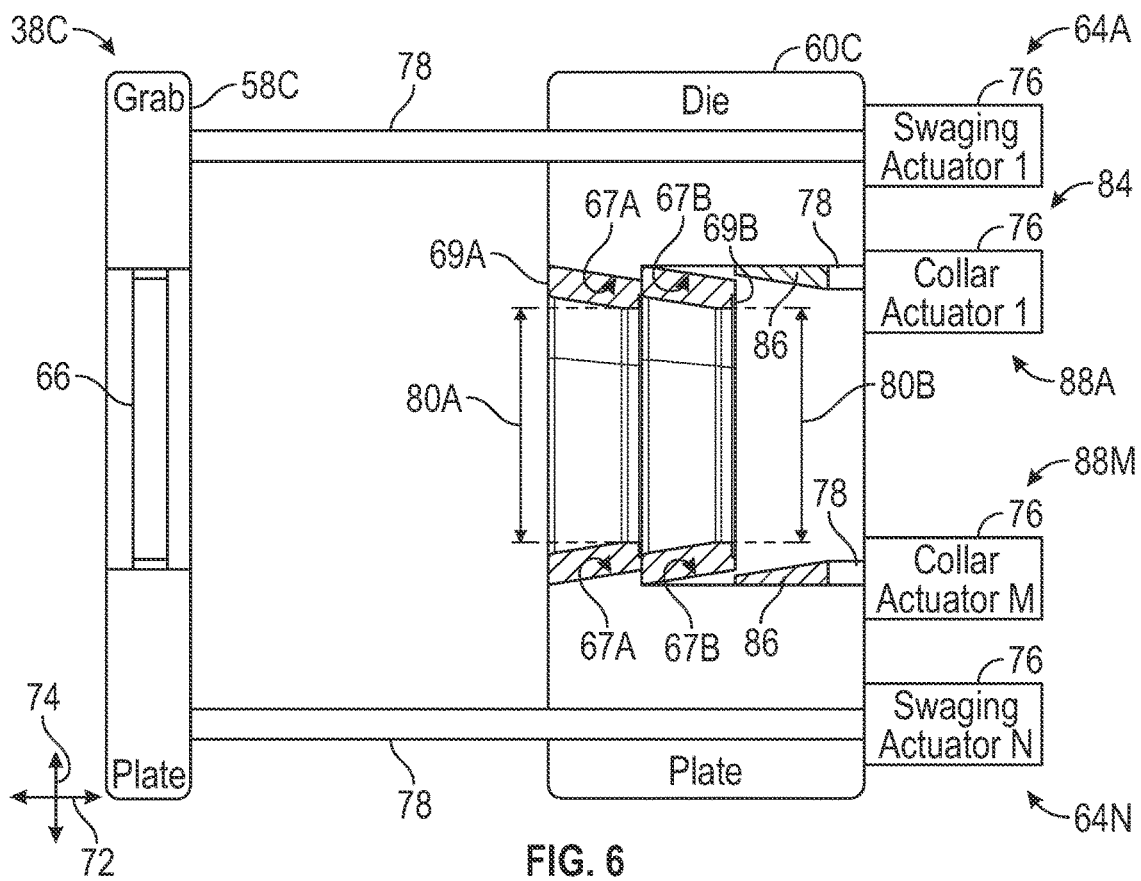
FIG. 6 is an axial cross-section profile of another example of a swage machine that includes a die set in its deactivated state, in accordance with an embodiment of the present disclosure.
Figure 7:
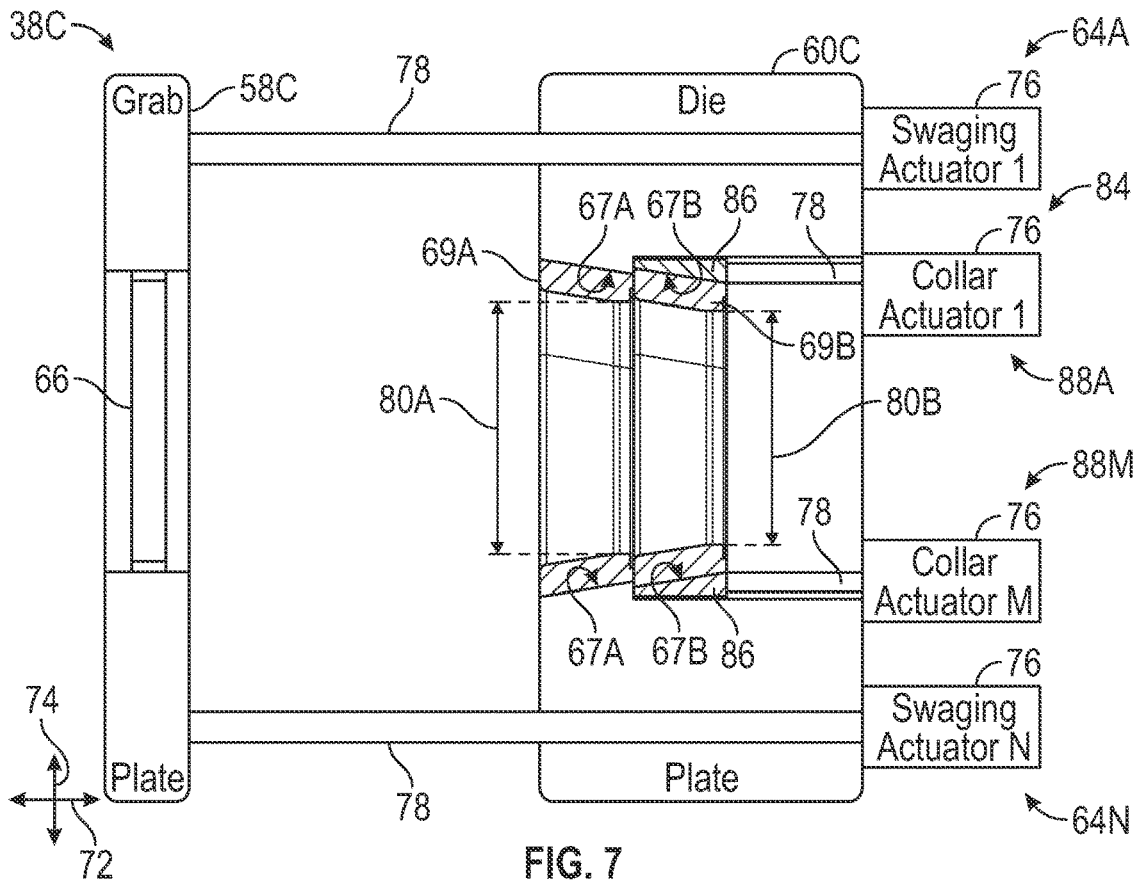
FIG. 7 is an axial cross-section profile of the swage machine of FIG. 6 with the die set in its activated state, in accordance with an embodiment of the present disclosure.

To help illustrate, an example of a swage machine 38C, which includes a die set 69 that can be selectively activated, is shown in FIGS. 6 and 7. To facilitate conformally deforming a fitting jacket 50 of a pipe fitting 18 around the tubing 22 of a pipe segment 20, as depicted, the swage machine 38C includes a grab plate 58C, a die plate 60C, and swaging actuators 64—namely a first swaging actuator 64A and an Nth swaging actuator 64N. In particular, as depicted, the grab plate 58C includes a grab tab 66, which may be implemented (e.g., sized and/or shaped) to matingly interlock (e.g., engage and/or interface) with a grab notch 68 on the grab ring 46 of a pipe fitting 18 to facilitate securing the swage machine 38C to the pipe fitting 18.

Additionally, as described above, in some embodiments, one or more swaging actuators 64 of a swage machine 38 may each be a fluid actuator, such as a hydraulic actuator or a pneumatic actuator. In other words, in some such embodiments, the first swaging actuator 64A and the Nth swaging actuator 64N of the swage machine 38C may each be a hydraulic actuator or a pneumatic actuator. In any case, as depicted, each swaging actuator 64 of the swage machine 38C includes an actuator cylinder 76 and an actuator piston 78, which may selectively extend out from the actuator cylinder 76 based at least in part on the supply of fluid (e.g., liquid and/or gas) to the actuator cylinder 76 and/or selectively retract into the actuator cylinder 76 based at least in part on the extraction of fluid from the actuator cylinder 76.

In particular, similar to FIG. 4, as depicted in FIGS. 6 and 7, the actuator cylinder 76 of each swaging actuator 64 in the swage machine 38C is secured to the die plate 60C of the swage machine 38C. Additionally, as depicted in FIGS. 6 and 7, the actuator piston 78 of each swaging actuator 64 extends through the die plate 60C and is secured to the grab plate 58C of the swage machine 38C. As such, similar to FIG. 4, to facilitate performing a swaging operation (e.g., pass), the swage machine 38C of FIGS. 6 and 7 may operate one or more of its swaging actuators 64 to pull the grab plate 58C toward the die plate 60C via one or more reverse (e.g., retracting) strokes. On the other hand, similar to FIG. 4, the swage machine 38C of FIGS. 6 and 7 may operate one or more of its swaging actuators 64 to push the grab plate 58C away from the die plate 60C via one or more forward (e.g., extending) strokes, for example, to facilitate loading a die set 69 into the die plate 60C and/or resetting the position of the die plate 60C for the performance of a subsequent swaging pass.

Moreover, similar to FIG. 5, as depicted in FIGS. 6 and 7, multiple die seats 67 are implemented in the die plate 60C of the swage machine 38C to enable multiple die sets 69 to be concurrently loaded therein. In particular, the die plate 60C includes a first (e.g., preceding) die seat 67A, which is implemented closer to the grab plate 58C and to enable a first (e.g., preceding and/or initial) die set 69A to be loaded therein such the first die set 69A opens toward the grab plate 58C. Additionally, the die plate 60C includes a second (e.g., subsequent) die seat 67B, which is implemented farther from the grab plate 58C and to enable a second (e.g., subsequent) die set 69B to be loaded therein such that the second die set 69B opens toward the grab plate 58C. As such, when compressed against a fitting jacket 50 of the pipe fitting 18 in an axial direction 72 toward the grab plate 58C, the shape of the first die set 69A and/or the shape of the second die set 69B may compress the fitting jacket 50 inwardly in a radial direction 74, for example, such that the fitting jacket 50 and pipe segment tubing 22 disposed in a corresponding tubing cavity 54 are conformally deformed.

However, as depicted in FIG. 6, when the outer surface of the first die set 69A directly abuts the inner surface of the first die seat 67A and the outer surface of the second die set 69B directly abuts the inner surface of the second die seat 67B, the ending inner surface diameter 80B of the second die set 69B is not smaller than the ending inner surface diameter 80A of the first die set 69B. In some embodiments, a subsequent (e.g., second) die set 69 may be in its activated state when its ending inner surface diameter 80 is smaller than the ending inner surface diameter 80 of a preceding (e.g., first) die set 69 and in its deactivated state when its ending inner surface diameter 80 is not smaller than (e.g., greater than or equal to) the ending inner surface diameter 80 of the preceding die set 69. In other words, in such embodiments, FIG. 6 depicts the swage machine 38C with the second die set 69B in its deactivated state.

On the other hand, as depicted in FIG. 7, the ending inner surface diameter 80B of the second die set 69B is smaller than the ending inner surface diameter 80A of the first die set 69A. As described above, in some embodiments, a subsequent (e.g., second) die set 69 may be in its activated state when its ending inner surface diameter 80 is smaller than the ending inner surface diameter 80 of a preceding (e.g., first) die set 69. In other words, in such embodiments, FIG. 7 depicts the swage machine 38C with the second die set 69B in its activated state.

As will be described in more detail, in some embodiments, implementing a swage machine 38 to enable a die set 69 loaded therein to be selectively activated may enable the die set 69 to be selectively used during different swaging passes. For example, during an initial (e.g., first and/or preceding) swaging pass, the swage machine 38C may maintain the second die set 69 in its deactivated state, thereby swaging a fitting jacket 50 of a pipe fitting 18 secured to the grab plate 58C primarily using the first die set 69. To swage the fitting jacket 50 using the second die set 69, the swage machine 38C may then transition the second die set 69 from its deactivated state to its activated state and maintain the second die set 69 in its activated state during a subsequent (e.g., second) swaging pass.

To facilitate selectively transitioning a die set 69 between its activated state and its deactivated state, as depicted in FIGS. 6 and 7, the swage machine 38C additionally includes a wedged activation assembly 84. As in the depicted example, the wedged activation assembly 84 of a swage machine 38 may include one or more collar actuators 88 and a wedged activation collar 86, which has a female taper that is implemented to be selectively inserted between a male taper of a die set 69 and a corresponding die seat 67. In particular, in the depicted example, the wedged activation assembly 84 includes a first collar actuator 88A and an Mth collar actuator 88M.

In some embodiments, one or more collar actuators 88 in a swage machine 38 may each be a fluid actuator, such as a hydraulic actuator or a pneumatic actuator. In other words, in some such embodiments, the first collar actuator 88A and the Mth collar actuator 88M of the swage machine 38C may each be a hydraulic actuator or a pneumatic actuator. In any case, as depicted, each collar actuator 88 in the swage machine 38C includes an actuator cylinder 76 and an actuator piston 78, which may selectively extend out from the actuator cylinder 76 based at least in part on the supply of fluid (e.g., liquid and/or gas) to the actuator cylinder 76 and/or selectively retract into the actuator cylinder 76 based at least in part on the extraction of fluid from the actuator cylinder 76.

In particular, as depicted, the actuator piston 78 of each collar actuator 88 in the swage machine 38C extends into the die plate 60C and is secured to the wedged activation collar 86, for example, while the actuator cylinder 76 of each collar actuator 88 is secured to the die plate 60C. As such, the swage machine 38C may operate one or more of its collar actuators 88 to facilitate selectively inserting the wedged activation collar 86 between a die set 69 and a corresponding die seat 67 and/or to facilitate selectively withdrawing the wedged activation collar 86 from between the die set 69 and the corresponding die seat 67. As depicted in FIGS. 6 and 7, the ending inner surface diameter 80B of the second die set 69B is smaller when more of the wedged activation collar 86 is present between the second die set 69B and the second die seat 67B and larger when less of the wedged activation collar is present between the second die set 69B and the second die seat 67B.

In other words, operating one or more collar actuators 88 of the swage machine 38C to insert more of the wedged activation collar 86 between the second die set 69B and the second die seat 67B may cause the ending inner surface diameter 80B of the second die set 69B to compress inwardly in a radial direction 74 and, thus, facilitate transitioning the second die set 69B from its deactivated state to its activated state. On the other hand, operating one or more collar actuators 88 of the swage machine 38C to withdraw more of the wedged activation collar 86 out from the between the second die set 69B and the second die seat 67B may enable the ending inner surface diameter 80B of the second die set 69B to expand outwardly in a radial direction 74 and, thus, facilitate transitioning the second die set 69B from its activated state to its deactivated state, for example, due to material spring back of the second die set 69B. In this manner, a swage machine 38 may be implemented to enable selectively activating one or more die sets 69 that are concurrently loaded in the swage machine 38, for example, to enable different die sets 69 that are concurrently loaded therein to be used to different swaging operations (e.g., passes).

However, it should be appreciated that the depicted example is merely intended to be illustrative and not limiting. In particular, in other embodiments, a swage machine 38 may include fewer than two (e.g., one) collar actuators 88 or more than two collar actuators 88. Additionally or alternatively, in other embodiments, the actuator cylinder 76 of a collar actuator 88 in a swage machine 38 may be secured to a support plate of the swage machine 38, for example, instead of its die plate 60. Moreover, in other embodiments, one or more swaging actuators 64 of a swage machine 38 may be implemented with a different configuration.

Figure 8:
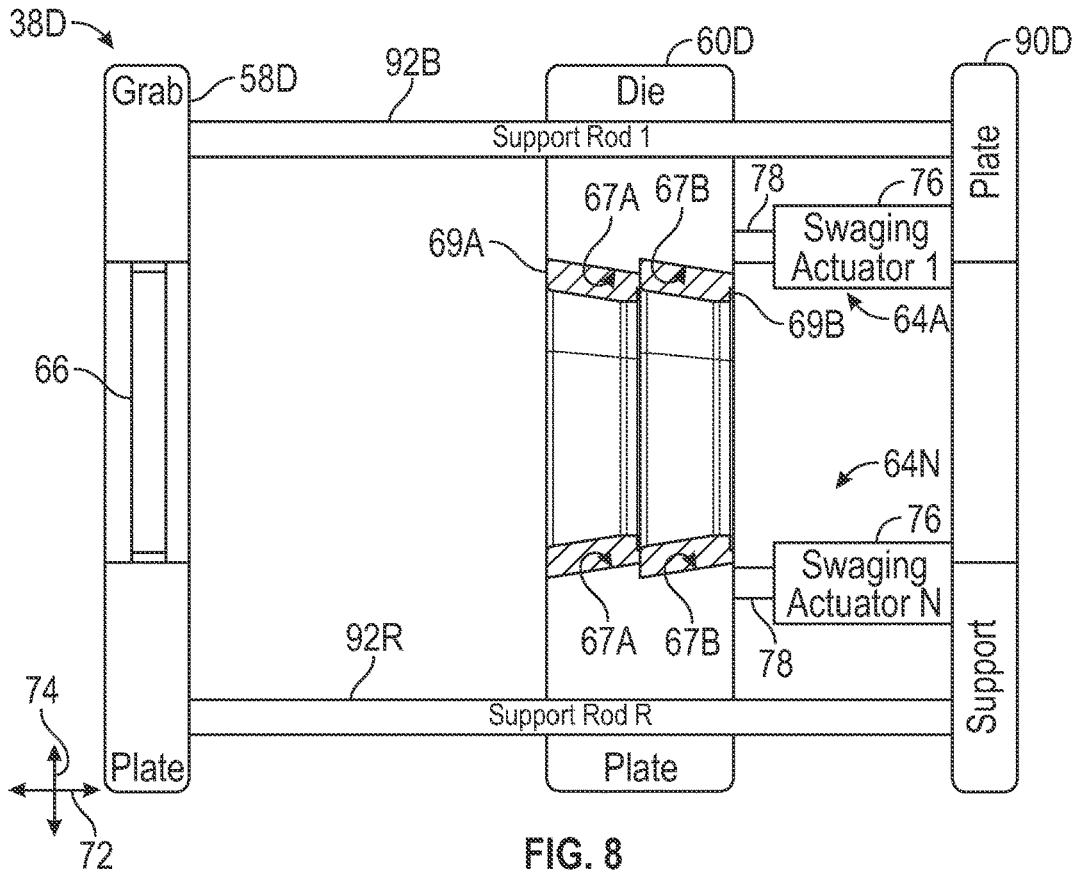
FIG. 8 is an axial cross-section profile of another example of a swage machine that includes a die plate with multiple die sets concurrently loaded therein, in accordance with an embodiment of the present disclosure.

To help illustrate, another example of a swage machine 38D that enables multiple die sets 69 to be concurrently loaded therein is shown in FIG. 8. To facilitate conformally deforming a fitting jacket 50 of a pipe fitting 18 around the tubing 22 of a pipe segment 20, as depicted, the swage machine 38D includes a support plate 90D in addition to a grab plate 58D, a die plate 60D, and swaging actuators 64—namely a first swaging actuator 64A and an Nth swaging actuator 64N. In particular, as depicted, the grab plate 58D includes a grab tab 66, which may be implemented (e.g., sized and/or shaped) to matingly interlock (e.g., engage and/or interface) with a grab notch 68 on the grab ring 46 of a pipe fitting 18 to facilitate securing the swage machine 38D to the pipe fitting 18.

Additionally, similar to FIG. 5, as depicted in FIG. 8, multiple die seats 67 are implemented in the die plate 60D of the swage machine 38D to enable multiple die sets 69 to be concurrently loaded therein. In particular, the die plate 60D includes a first (e.g., preceding) die seat 67A, which is implemented closer to the grab plate 58D and to enable a first (e.g., preceding) die set 69A to be loaded therein such the first die set 69A opens toward the grab plate 58D. Additionally, the die plate 60D includes a second (e.g., subsequent) die seat 67B, which is implemented farther from the grab plate 58D and to enable a second (e.g., subsequent) die set 69B to be loaded therein such that the second die set 69B opens toward the grab plate 58D. As such, when compressed against a fitting jacket 50 of the pipe fitting 18 in an axial direction 72 toward the grab plate 58D, the shape of the first die set 69A and/or the shape of the second die set 69B may compress the fitting jacket 50 inwardly in a radial direction 74, for example, such that the fitting jacket 50 and pipe segment tubing 22 disposed in a corresponding tubing cavity 54 are conformally deformed.

However, as depicted in FIG. 8, the swaging actuators 64 of the swage machine 38D are secured to the die plate 60D of the swage machine 38D as well as the support plate 90D of the swage machine 38D. Nevertheless, as described above, in some embodiments, one or more swaging actuators 64 of a swage machine 38 may each be a fluid actuator, such as a hydraulic actuator or a pneumatic actuator. In other words, in some such embodiments, the first swaging actuator 64A and the Nth swaging actuator 64N of the swage machine 38D may each be a hydraulic actuator or a pneumatic actuator. In any case, as depicted, each swaging actuator 64 of the swage machine 38D includes an actuator cylinder 76 and an actuator piston 78, which may selectively extend out from the actuator cylinder 76 based at least in part on the supply of fluid (e.g., liquid and/or gas) to the actuator cylinder 76 and/or selectively retract into the actuator cylinder 76 based at least in part on the extraction of fluid from the actuator cylinder 76.

In particular, as depicted, the actuator cylinder 76 of each swaging actuator 64 in the swage machine 38D is secured to the support plate 90D of the swage machine 38D. Additionally, as depicted, the actuator piston 78 of each swaging actuator 64 is secured to the die plate 60D of the swage machine 38D. As such, to facilitate performing a swaging operation (e.g., pass), the swage machine 38D may operate one or more of its swaging actuators 64 to push the die plate 60D toward the grab plate 58D via one or more forward (e.g., extending) strokes. On the other hand, the swage machine 38D may operate one or more of its swaging actuators 64 to pull the die plate 60D away from the grab plate 58D via one or more reverse (e.g., retracting) strokes, for example, to facilitate loading a die set 69 into the die plate 60D and/or resetting the position of the die plate 60D for the performance of a subsequent swaging operation (e.g., pass).

To enable the die plate 60D to move (e.g., slide) in axial direction 72 between the grab plate 58D and the support plate 90D, as in the depicted example, in some embodiments, the swage machine 38D may include one more support rods 92, which are each secured to the grab plate 58D and the support plate 90D such that it extends through the die plate 60D. In particular, in the depicted example, the swage machine 38D includes a first support rod 92A and an Rth support rod 92R. In this manner, a swage machine 38 may be implemented to enable multiple different die sets 69 to be concurrently loaded therein.

However, it should be appreciated that the depicted example is merely intended to be illustrative and not limiting. In particular, in other embodiments, a swage machine 38 may additionally include a wedged activation assembly 84, which is implemented and/or operated to selectively activate one or more die sets 69 that have been concurrently loaded in its die plate 60. Additionally or alternatively, in other embodiments, a swage machine 38 may include less than two (e.g., zero or one) support rods 92 or more than two (e.g., three, four, or more) support rods 92. Furthermore, in other embodiments, a swage machine 38 may include one or more other types of support members, such as a housing of the swage machine 38, in addition to or as an alternative to one or more support rods 92. In any case, implementing a swage machine 38 in accordance with the techniques of the present disclosure may enable multiple different die sets 69 to be concurrently loaded in the swage machine 38, which, at least in some instances, may facilitate improving the efficiency with which the swage machine 38 secures a pipe fitting 18 to a pipe segment 20 and, thus, the deployment efficiency of a pipeline system 10 in which the pipe fitting 18 and the pipe segment 20 are to be deployed, for example, at least in part by obviating a pause between successive swaging passes of a swaging process to swap out die sets 69.

Figure 9:
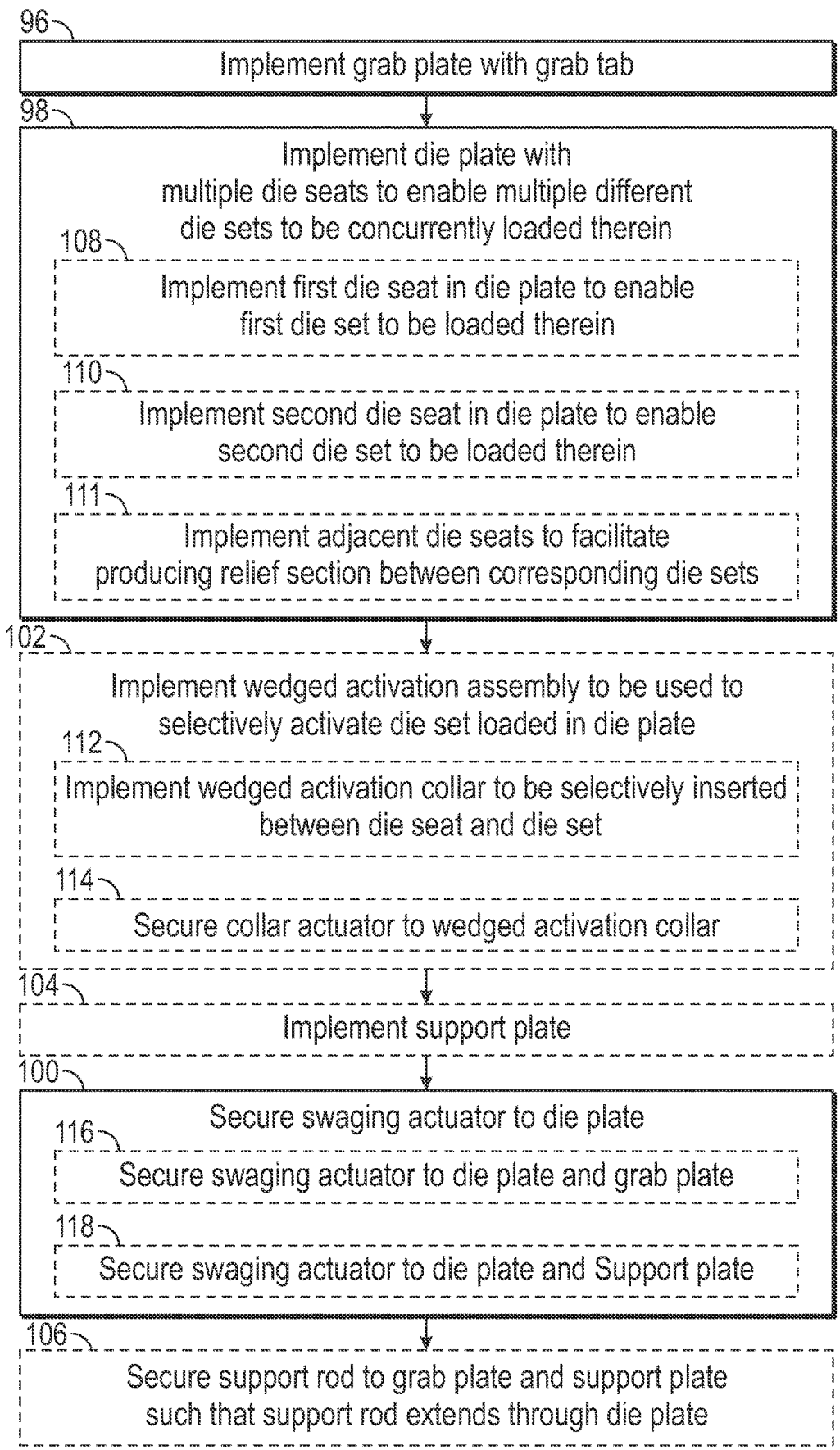
FIG. 9 is a flow diagram of an example of a process for implementing a swage machine that enables multiple different die sets to be concurrently loaded in its die plate, in accordance with an embodiment of the present disclosure.

To help further illustrate, an example of a process 94 for implementing a swage machine 38 is described in FIG. 9. Generally, the process 94 includes implementing a grab plate with a grab tab (process block 96). Additionally, the process 94 generally includes implementing a die plate with multiple die seats to enable multiple different die sets to be concurrently loaded therein (process block 98) and securing a swaging actuator to the die plate (process block 100).

Although described in a specific order, which corresponds with an embodiment of the present disclosure, it should be appreciated that the example process 94 is merely intended to be illustrative and not limiting. In particular, in other embodiments, a process 94 for implementing a swage machine 38 may include one or more additional process blocks and/or omit one or more of the depicted process blocks. For example, some embodiments of the process 94 may additionally include implementing a wedged activation assembly to be used to selectively activate a die set loaded in the die plate (process block 102) while other embodiments of the process 94 do not. Furthermore, some embodiments of the process 94 may additionally include implementing a support plate (process block 104) while other embodiments of the process 94 do not. Moreover, some embodiments of the process 94 may include securing a support rod to the grab plate and the support plate such that the support rod extends through the die plate (process block 106) while other embodiments of the process 94 do not. Additionally or alternatively, in other embodiments, one or more of the depicted process blocks may be performed in a different order, for example, such that the die plate 60 is implemented before the grab plate 58.

In any case, as described above, a swage machine 38 may include a grab plate 58 with a grab tab 66, which is implemented (e.g., shaped and/or sized) to matingly interlock with a grab notch 68 on the grab ring 46 of a pipe fitting 18 that is to be swaged by the swage machine 38. As such, implementing the swage machine 38 may include implementing a grab plate 58 with a grab tab 66 (process block 96). In some embodiments, the grab plate 58 of the swage machine 38 may be implemented at least in part using metal, such as carbon steel, stainless steel, duplex stainless steel, and/or super duplex stainless steel.

Additionally, as described above, a swage machine 38 may include a die plate 60, which is implemented with multiple die seats 67 to enable multiple different die sets 69 to be concurrently loaded (e.g., installed) therein. As such, implementing the swage machine 38 may include implementing a die plate 60 with multiple die seats 67 to enable multiple different die sets 69 to be concurrently loaded (e.g., installed) therein, for example, such that each of the die sets 69 opens toward the grab plate 58 of the swage machine 38 (process block 98). In other words, in some embodiments, implementing the die plate 60 with multiple die seats 67 may include implementing a first die seat 67A in the die plate 60 to enable a first die set 69A to be loaded therein (process block 108) and implementing a second die seat 67B in the die plate 60 to enable a second die set 69B to be loaded therein (process block 110).

Additionally, as described above, in some embodiments, adjacent die seats 67 (e.g., first die seat 67A and second die seat 67B) may be implemented in the die plate 60 of the swage machine 38 such that, when corresponding die sets 69 are loaded in the adjacent die seats 67, a relief section 83 results at the junction between the die sets 69 (process block 111). In particular, as described above, in some embodiments, a relief section 83 may be produced at a junction between a preceding die set 69 (e.g., first die set 69A) and a subsequent die set 69 (e.g., second die set 69B) as a result of the starting inner surface diameter 82 of the subsequent die set 69 being larger than the ending inner surface diameter 80 of the preceding die set 69. As such, the relief section 83 may enable a fitting jacket 50 of a pipe fitting 18 to expand outward slightly in a radial direction 74 once it passes through the preceding die set 69 (e.g., due to material spring back), which, at least in some instances, may facilitate reducing the force sufficient to pass the subsequent die set 69 over the fitting jacket 50, for example, to facilitate enabling the swage machine 38B to secure the pipe fitting 18 to pipe segment tubing 22 via a single swaging pass.

Furthermore, in some embodiments, the die plate 60 of the swage machine 38 may be implemented at least in part using metal, such as carbon steel, stainless steel, duplex stainless steel, and/or super duplex stainless steel. Thus, in some such embodiments, a die seat 67 may be implementing in the die plate 60 at least in part by milling (e.g., removing material from) the die plate 60, for example, after an initial manufacturing process. However, in other embodiments, a die seat 67 may be implemented at least in part by molding (e.g., deforming) the die seat 67 into the die plate 60, for example, during an initial manufacturing process.

Moreover, as described above, in some embodiments, a swage machine 38 may include a wedged activation assembly 84, which is implemented to enable a die set 69 loaded in its die plate 60 to be selectively activated. In other words, in such embodiments, implementing the swage machine 38 may include implementing a wedged activation assembly 84 to be used to selectively activate a (e.g., second and/or subsequent) die set 69 loaded in the die plate 60 of the swage machine 38 (process block 102). For example, in some such embodiments, the wedged activation assembly 84 may by implemented to enable the second die set 69B that is loaded in the second die seat 67B of the die plate 60 to be selectively activated.

In any case, as described above, in some embodiments, a wedged activation assembly 84 of a swage machine 38 may include a wedged activation collar 86, which has a female taper that is implemented to be selectively inserted between the male taper of a die set 69 that is loaded in its die plate 60 and a corresponding die seat 67. In other words, in such embodiments, implementing the wedged activation assembly 84 may include implementing a wedged activation collar 86 that is to be selectively inserted and/or withdrawn from between the die set 69 and its corresponding die seat 67 (process block 112). In particular, in some such embodiments, the wedged activation collar 86 of the swage machine 38 may be implemented at least in part using metal, such as carbon steel, stainless steel, duplex stainless steel, and/or super duplex stainless steel.

Additionally, to facilitate selectively inserting a wedged activation collar 86 of a wedged activation assembly 84 between a die set 69 and a corresponding die seat 67, in some embodiments, the wedged activation assembly 84 may include one or more one or more collar actuators 88 secured to the wedged activation collar 86. In other words, in such embodiments, implementing the wedged activation assembly 84 may include securing one or more collar actuators 88 to its wedged activation collar 86 (process block 114). In particular, in some such embodiments, a collar actuator 88 of the wedged activation assembly 84 may be secured in the swage machine 38 such that the actuator piston 78 of the collar actuator 88 is secured to the wedged activation collar 86 of the wedged activation assembly 84, for example, while the actuator cylinder 76 of the collar actuator 88 is secured to the die plate 60 or a support plate 90 of the swage machine 38.

In any case, to facilitate moving its grab plate 58 and its die plate 60 toward one another in an axial direction 72, as described above, a swage machine 38 may include one or more swaging actuators 64 secured to its die plate 60. As such, implementing the swage machine 38 may include securing one or more swaging actuators 64 to the die plate 60 of the swage machine 38 (process block 100). In particular, as described above, in some embodiments, a swaging actuator 64 of a swage machine 38 may be secured to the die plate 60 of the swage machine 38 as well as the grab plate 58 of the swage machine 38. In other words, in such embodiments, securing the swaging actuator 64 in the swage machine 38 may include securing the swaging actuator 64 to the die plate 60 as well as the grab plate 58 of the swage machine 38 (process block 116). In particular, in some such embodiments, the actuator cylinder 76 of the swaging actuator 64 may be secured to the die plate 60 and the actuator piston 78 of the swaging actuator 64 may extend through the die plate 60 and be secured to the grab plate 58 or vice versa, for example, to enable the swage machine 38 to perform a swaging operation (e.g., pass) at least in part by operating the swaging actuator 64 to pull the grab plate 58 toward the die plate 60.

However, as described above, in other embodiments, a swaging actuator 64 of a swage machine 38 may be secured to (e.g., between) the die plate 60 and a support plate 90 of the swage machine 38. In other words, in such embodiments, implementing the swage machine 38 may include implementing a support plate 90, for example, at least in part using metal, such as carbon steel, stainless steel, duplex stainless steel, and/or super duplex stainless steel (process block 98). Additionally, in such embodiments, securing the swaging actuator 64 in the swage machine 38 may include securing the swaging actuator 64 to (e.g., between) the die plate 60 and the support plate 90 of the swage machine 38 (process block 118). In particular, in some such embodiments, the actuator cylinder 76 of the swaging actuator 64 may be secured to the support plate 90 and the actuator piston 78 of the swaging actuator 64 may be secured to the die plate 60 or vice versa, for example, to enable the swage machine 38 to perform a swaging operation (e.g., pass) at least in part by operating the swaging actuator 64 to push the die plate 60 toward the grab plate 58.

Moreover, as described above, in some embodiments, a swage machine 38 may additionally include one or more support rods 92 secured to its grab plate 58 and its support plate 90 such that the one or more support rods 92 extend through its die plate 60. In other words, in such embodiments, implementing the swage machine 38 may include securing one or more support rods 92 to the grab plate 58 and the support plate 90 of the swage machine 38 such that the one or more support rods 92 extend through the die plate 60 of the swage machine 38, for example, to enable the die plate 60 to slide in an axial direction 72 between the grab plate 58 and the support plate 90 (process block 106). In particular, in some such embodiments, one or more support rods 92 of the swage machine 38 may be implemented at least in part using metal, such as carbon steel, stainless steel, duplex stainless steel, and/or super duplex stainless steel. In this manner, the present disclosure provides techniques for implementing a swage machine 38 that enables multiple different die sets 69 to be concurrently loaded therein and, thus, used while the swage machine 38 operates to perform one or more swaging operations (e.g., passes) in a swaging process.

Figure 10:
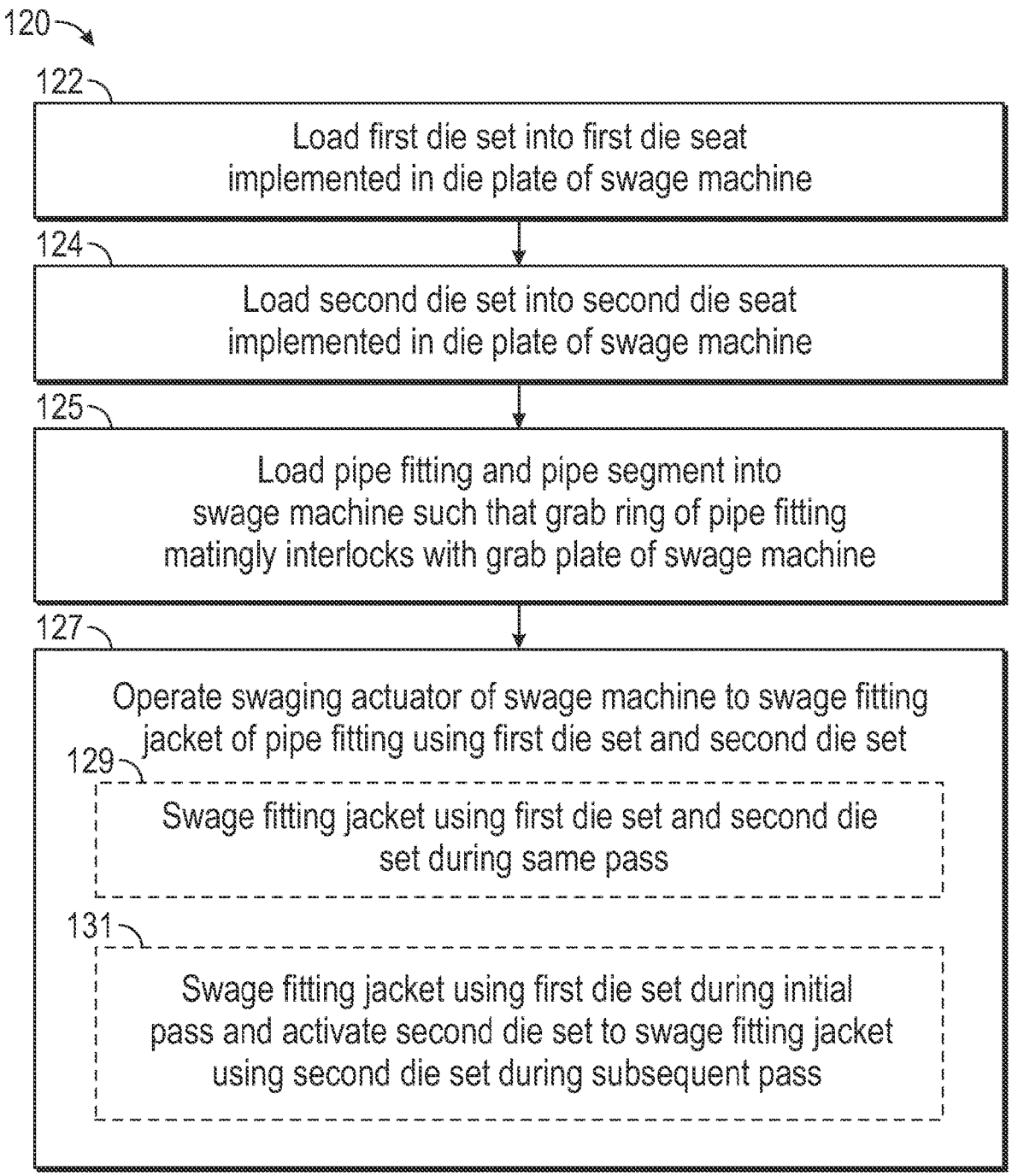
FIG. 10 is a flow diagram of an example of a process for operating a swage machine that is implemented to enable multiple different die sets to be concurrently loaded in its die plate, in accordance with an embodiment of the present disclosure.

To help further illustrate, an example of a process 120 for operating a swage machine 38 is described in FIG. 10. Generally, the process 120 includes loading a first die set into a first die seat implemented in a die plate of a swage machine (process block 122) and loading a second die set into a second die seat implemented in the die plate of the swage machine (process block 124). Additionally, the process 120 generally includes loading a pipe fitting and a pipe segment into the swage machine such that a grab ring of the pipe fitting matingly interlocks with a grab plate of the swage machine (process block 125) and operating a swaging actuator of the swage machine to swage a fitting jacket of the pipe fitting using the first die set and the second die set (process block 127).

Although described in a specific order, which corresponds with an embodiment of the present disclosure, it should be appreciated that the example process 120 is merely intended to be illustrative and not limiting. In particular, in other embodiments, a process 120 for operating a swage machine 38 may include one or more additional process blocks and/or omit one or more of the depicted process blocks. Additionally or alternatively, in other embodiments, one or more of the depicted process blocks may be performed in a different order, for example, such that the second (e.g., subsequent) die set is loaded in the second die seat before the first (e.g., preceding) die set is loaded in the first die seat.

In any case, as described above, to enable multiple different die sets 69 to be concurrently loaded in its die plate 60, a swage machine 38 may include multiple die seats 67 implemented in the die plate 60. In particular, the die plate 60 may include a first (e.g., preceding) die seat 67A that is implemented closer to the grab plate 58 of the swage machine 38 and to enable a first (e.g., preceding) die set 69A, which is to be used during one or more swaging operations (e.g., passes), to be loaded therein. As such, operating the swage machine 38 may include loading a first die set 69A into a first die seat 67A that is implemented in the die plate 60 of the swage machine 38, for example, such that the first die set 69A opens toward the grab plate 58 of the swage machine 38 (process block 122). In particular, in some embodiments, the first die set 69A may be loaded in the die plate 60 such that an outer surface of the first die set 69A directly abuts an inner surface of the first die seat 67A.

In addition to a first die seat 67, as described above, a swage machine 38 may include a second (e.g., subsequent) die seat 67B that is implemented farther from the grab plate 58 of the swage machine 38 and to enable a second (e.g., subsequent) die set 69B, which is to be used during one or more swaging operations (e.g., passes), to be loaded therein. As such, operating the swage machine 38 may include loading a second die set 69B into a second die seat 67B that is implemented in the die plate 60 of the swage machine 38, for example, such that the second die set 69B opens toward the grab plate 58 of the swage machine 38 (process block 124). In particular, in some embodiments, the second die set 69B may be loaded (e.g., initially) in the die plate 60 such that an outer surface of the second die set 69B directly abuts an inner surface of the second die seat 67B. Additionally, as described above, in some embodiments, the second (e.g., subsequent) die set 69B may be loaded in the second die seat 67B and the first (e.g., preceding) die set 69A may loaded in the first die seat 67A such that a relief section 83 is produced at the junction between the first die set 69A and the second die set 69B, for example, to facilitate enabling the swage machine 38 to secure a pipe fitting 18 to pipe segment tubing 22 via a single swaging pass.

Furthermore, as described above, a swage machine 38 may include a grab plate 58 with a grab tab 66, which is implemented (e.g., sized and/or shaped) to matingly interlock with a grab notch 68 on a grab ring 46 of a pipe fitting 18 that is to be swaged by the swage machine 38. Additionally, as described above, a pipe fitting 18 may be secured to a pipe segment 20 at least in part by operating a swage machine 38 to conformally deform a fitting jacket 50 of the pipe fitting 18 around the tubing 22 of the pipe segment 20. As such, operating the swage machine 38 may include loading a pipe fitting 18 and a pipe segment 20 to be secured thereto into the swage machine 38 such that the grab notch 68 on the grab ring 46 of the pipe fitting 18 matingly interlocks with the grab tab 66 on the grab plate 58 of the swage machine 38 (process block 125).

Moreover, as described above, a swage machine 38 may then perform a swaging operation at least in part by operating one or more of its swaging actuators 64 to cause one or more die sets 69 loaded in its die plate 60 to pass over a fitting jacket 50 of a pipe fitting 18 that is secured to the swage machine 38 (process block 127). In particular, as described above, when each die set 69 loaded therein directly abuts a corresponding die seat 67, in some embodiments, the ending inner surface diameter 80B of the second (e.g., subsequent) die set 69B may be smaller than the ending inner surface diameter 80A of the first (e.g., preceding) die set 69A. Thus, in such embodiments, operating one or more swaging actuators 64 of the swage machine 38 may include swaging the fitting jacket 50 of the pipe fitting 18 using the first die set 69A as well as the second die set 69B during the swaging pass (process block 129).

However, as described above, in other embodiments, when each die set 69 loaded in the die plate 60 of the swage machine 38 directly abuts a corresponding die seat 67, the ending inner surface diameter 80B of the second (e.g., subsequent) die set 69B may not be smaller than the ending inner surface diameter 80A of the first (e.g., preceding) die set 69A. As described above, a subsequent (e.g., second) die set 69 may be in its activated state when its ending inner surface diameter 80 is smaller than the ending inner surface diameter 80 of a preceding (e.g., first) die set 69 and in its deactivated state when its ending inner surface diameter 80 is not smaller than (e.g., greater than or equal to) the ending inner surface diameter 80 of the preceding die set 69. In other words, in such embodiments, the second die set 69B may be in its deactivated state when it directly abuts the second die seat 67B.

Moreover, as described above, to enable the second (e.g., subsequent) die set 69B to be used to swage the fitting jacket 50 of the pipe fitting 18, in such embodiments, the swage machine may include a wedged activation assembly 84, which is implemented and/or operated to facilitate transitioning the second die set 69B between its deactivated state and its activated state. Thus, in such embodiments, operating one or more swaging actuators 64 of the swage machine 38 may include swaging the fitting jacket 50 of the pipe fitting 18 using the first die set 69A during an initial (e.g., preceding) swaging pass and activating the second die set 69B using the wedged activation assembly 84 to swage the fitting jacket using the second die set 69B during a subsequent swaging pass (process block 131). In other words, in such embodiments, the swage machine 38 may maintain the second die set 69B in its deactivated state during the initial swaging pass, for example, at least in part by using one or more collar actuators 88 of the wedged activation assembly 84 to maintain a wedged activation collar 86 of the wedged activation assembly 84 withdrawn from between the second die set 69B and the second die seat 67B. On the other hand, in such embodiments, the swage machine 38 may maintain the second die set 69B in its activated state during the subsequent swaging pass, for example, at least in part by using one or more collar actuators 88 of the wedged activation assembly 84 to maintain a wedged activation collar 86 of the wedged activation assembly 84 inserted between the second die set 69B and the second die seat 67B.

In this manner, a swage machine 38, which includes multiple different die sets 69 loaded in its die plate 60, may be operated to swage a fitting jacket 50 of a pipe fitting 18 around the tubing 22 of a pipe segment 20 to facilitate securing the pipe fitting 18 to the pipe segment 20. However, it should again be appreciated that the above examples are merely intended to be illustrative and not limiting. In particular, as briefly mentioned above, in other embodiments, a swage machine 38 may be implemented with multiple die plates 60 to enable multiple different die sets 69 to be concurrently loaded therein.

Figure 11:
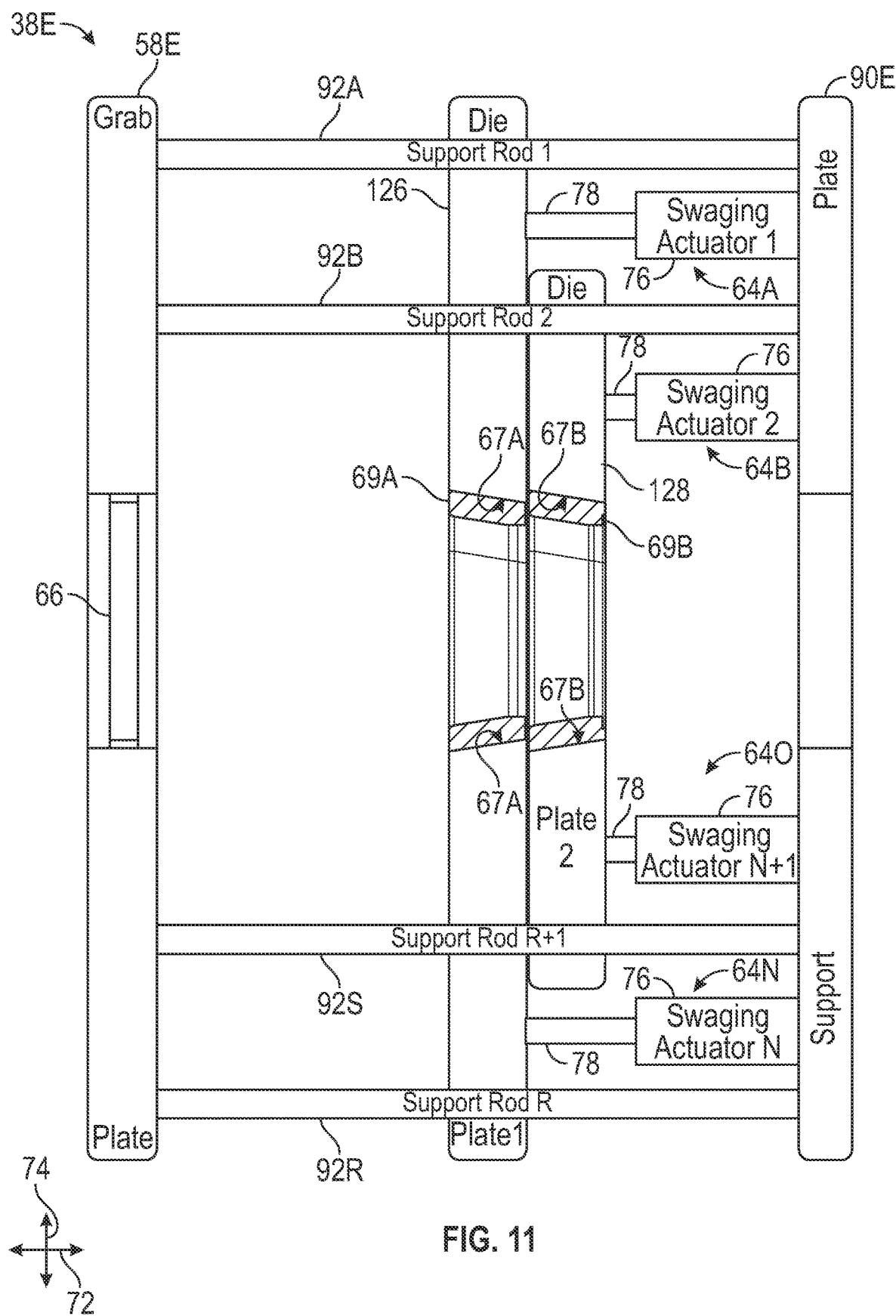
FIG. 11 is an axial cross-section profile of an example of a swage machine that includes multiple die plates, in accordance with an embodiment of the present disclosure.

To help illustrate, an example of a swage machine 38E, which includes multiple die plates 60—namely a first (e.g., preceding) die plate 126 and a second (e.g., subsequent) die plate 128, is shown in FIG. 11. In particular, as depicted, a first die seat 67A is implemented in the first die plate 126 of the swage machine 38E to enable a first die set 69A to be loaded therein. Additionally, as depicted, a second die seat 67B is implemented in the second die plate 128 of the swage machine 38E to enable a second die set 69B to be loaded therein.

Furthermore, to facilitate conformally deforming a fitting jacket 50 of a pipe fitting 18 around the tubing 22 of a pipe segment 20, as depicted, the swage machine 38E additionally includes a grab plate 58E, a support plate 90E, and swaging actuators 64—namely a first swaging actuator 64A, a second swaging actuator 64B, an Nth swaging actuator 64N, and an N+1th swaging actuator 64O. In particular, as depicted, the grab plate 58E includes a grab tab 66, which may be implemented (e.g., sized and/or shaped) to matingly interlock (e.g., engage and/or interface) with a grab notch 68 on the grab ring 46 of the pipe fitting 18. In other words, the grab plate 58E may be implemented to facilitate securing the swage machine 38E to the pipe fitting 18.

Additionally, as described above, in some embodiments, one or more swaging actuators 64 of a swage machine 38 may each be a fluid actuator, such as a hydraulic actuator or a pneumatic actuator. In other words, in some such embodiments, the first swaging actuator 64A, the second swaging actuator 64B, the Nth swaging actuator 64N, and the N+1th swaging actuator 64O of the swage machine 38E may each be a hydraulic actuator or a pneumatic actuator. In any case, as depicted, each swaging actuator 64 of the swage machine 38E includes an actuator cylinder 76 and an actuator piston 78, which may selectively extend out from the actuator cylinder 76 based at least in part on the supply of fluid (e.g., liquid and/or gas) to the actuator cylinder 76 and/or selectively retract into the actuator cylinder 76 based at least in part on the extraction of fluid from the actuator cylinder 76. In particular, similar to FIG. 8, as depicted in FIG. 11, the actuator cylinder 76 of each swaging actuator 64 is secured to the support plate 90E of the swage machine 38E.

However, as depicted in FIG. 11, the actuator piston 78 of each swaging actuator 64 in the swage machine 38E is secured to one of multiple die plates 60 in the swage machine 38E. In particular, as depicted, the actuator pistons 78 of the first swaging actuator 64A and the Nth swaging actuator 64N are both secured to the first die plate 126. As such, to facilitate performing a swaging operation (e.g., pass) using the first die set 69A that is loaded in the first die plate 126, the swage machine 38E may operate the first swaging actuator 64A and/or the Nth swaging actuator 64N to push the first die plate 126 toward the grab plate 58E via one or more forward (e.g., extending) strokes. On the other hand, the swage machine 38E may operate the first swaging actuator 64A and/or the Nth swaging actuator 64N to pull the first die plate 126 away from the grab plate 58E via one or more reverse (e.g., retracting) strokes, for example, to facilitate loading a die set 69 into the first die plate 126 and/or resetting the position of the first die plate 126 for the performance of a subsequent swaging operation (e.g., pass). To enable the first die plate 126 to move (e.g., slide) in an axial direction 72 between the grab plate 58E and the support plate 90E, in the depicted example, the swage machine 38E additionally includes support rods 92—namely a first support rod 92A and an Rth support rod 92R—that are each secured to the grab plate 58E and the support plate 90E such that it extends through the first die plate 126.

Additionally, as depicted, the actuator pistons 78 of the second swaging actuator 64B and the N+1th swaging actuator 64O are both secured to the second die plate 128. As such, to facilitate performing a swaging operation (e.g., pass) using the second die set 69B that is loaded in the second die plate 128, the swage machine 38E may operate the second swaging actuator 64B and/or the N+1th swaging actuator 64O to push the second die plate 128 toward the grab plate 58E via one or more forward (e.g., extending) strokes. On the other hand, the swage machine 38E may operate the second swaging actuator 64B and/or the N+1th swaging actuator 64O to pull the second die plate 128 away from the grab plate 58E via one or more reverse (e.g., retracting) strokes, for example, to facilitate loading a die set 69 into the second die plate 128 and/or resetting the position of the second die plate 128 for the performance of a subsequent swaging operation (e.g., pass). To enable the second die plate 128 to move (e.g., slide) in an axial direction 72 between the grab plate 58E and the support plate 90E, in the depicted example, the swage machine 38E additionally includes support rods 92—namely a second support rod 92B and an R+1th support rod 92S—that are each secured to the grab plate 58E and the support plate 90E such that it extends through the second die plate 128 as well as the first die plate 126.

Moreover, as depicted, the second die plate 128 is implemented farther from the grab plate 58E of the swage machine 38E while the first die plate 126 is implemented closer to the grab plate 58E of the swage machine 38E. Thus, to facilitate securing a pipe fitting 18 to a pipe segment 20, in some embodiments, the swage machine 38E may operate the first swaging actuator 64A and/or the Nth swaging actuator 64N to push the first die plate 126 and, thus, the first die set 69A loaded therein over a fitting jacket 50 of the pipe fitting 18 in an axial direction 72 toward the grab plate 58E during an initial (e.g., preceding and/or first) swaging pass while operating the second swaging actuator 64B and/or the N+1th swaging actuator 64O to push the second die plate 128 and, thus, the second die set 69B loaded therein over the fitting jacket 50 of the pipe fitting 18 in the axial direction 72 toward the grab plate 58E during a subsequent (e.g., second) swaging pass. However, in other embodiments, the swaging actuators 64 of the swage machine 38E may be operated to push the first die plate 126 as well as the second die plate 128 over the fitting jacket 50 of the pipe fitting 18 during the same swaging pass. In this manner, a swage machine 38 may be implemented with multiple die plates 60 to enable multiple different die sets 69 to be concurrently loaded therein.

However, it should be appreciated that the depicted example is merely intended to be illustrative and not limiting. In particular, in other embodiments, a swage machine 38 may include more than two (e.g., three, four, or more) die plates 60. Additionally or alternatively, in other embodiments, a swage machine 38 may include less than four (e.g., two or three) support rods 92 or more than four (e.g., five, six, or more) support rods 92. Furthermore, in other embodiments, a swage machine 38 may include one or more other types of support members, such as a housing of the swage machine 38, in addition to or as an alternative to one or more support rods 92. In any case, implementing a swage machine 38 in accordance with the techniques of the present disclosure may enable multiple different die sets 69 to be concurrently loaded in the swage machine 38, which, at least in some instances, may facilitate improving the efficiency with which the swage machine 38 secures a pipe fitting 18 to a pipe segment 20, for example, at least in part by obviating a pause between success swaging passes in a swaging process to swap out die sets 69.

Figure 12:
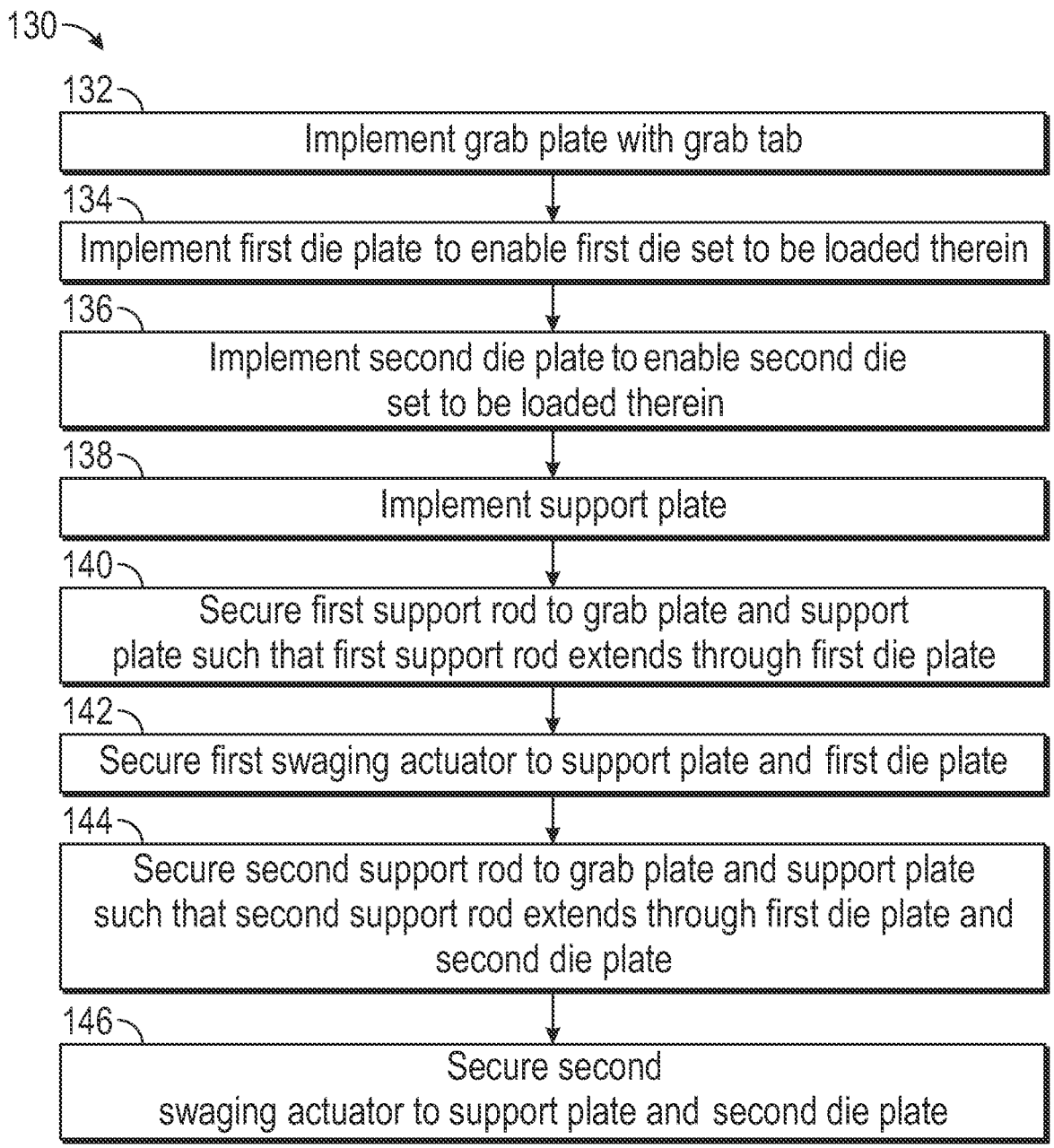
FIG. 12 is a flow diagram of an example of a process for implementing a swage machine that includes multiple die plates, in accordance with an embodiment of the present disclosure.

To help further illustrate, another example of a process 130 for implementing a swage machine 38 is described in FIG. 12. Generally, the process 130 includes implementing a grab plate with a grab tab (process block 132), implementing a first die plate to enable a first die set to be loaded therein (process block 134), implementing a second die plate to enable a second die set to be loaded therein (process block 136), and implementing a support plate (process block 138). Additionally, the process 130 generally includes securing a first support rod to the grab plate and the support plate such that the first support rod extends through the first die plate (process block 140), securing a first swaging actuator to the support plate and the first die plate (process block 142), securing a second support rode to the grab plate and the support plate such that the second support rod extends through the first die plate and the second die plate (process block 144), and securing a second swaging actuator to the support plate and the second die plate (process block 146).

Although described in a specific order, which corresponds with an embodiment of the present disclosure, it should be appreciated that the example process 130 is merely intended to be illustrative and not limiting. In particular, in other embodiments, a process 130 for implementing a swage machine 38 may include one or more additional process blocks and/or omit one or more of the depicted process blocks. Additionally or alternatively, in other embodiments, one or more of the depicted process blocks may be performed in a different order, for example, such that one or more of the die plates 60 are implemented before the grab plate 58.

In any case, as described above, a swage machine 38 may include a grab plate 58 with a grab tab 66, which is implemented (e.g., shaped and/or sized) to matingly interlock with a grab notch 68 on the grab ring 46 of a pipe fitting 18 that is to be swaged by the swage machine 38. As such, implementing the swage machine 38 may include implementing a grab plate 58 with a grab tab 66 (process block 132). In some embodiments, the grab plate 58 of the swage machine 38 may be implemented at least in part using metal, such as carbon steel, stainless steel, duplex stainless steel, and/or super duplex stainless steel.

Additionally, as described above, a swage machine 38 may include multiple die plates 60 (e.g., first die plate 126 and second die plate 128), which are each implemented with one or more die seats 67 to enable multiple different die sets 69 to be concurrently loaded (e.g., installed) in the swage machine 38. In particular, the swage machine 38 may include a first (e.g., preceding) die plate 126, which is implemented closer to the grab plate 58 of the swage machine 38 and with a first die seat 67A that enables a first (e.g., preceding) die set 69A to be loaded therein. As such, implementing the swage machine 38 may include implementing a first die plate 126 with a first die seat 67A that enables a first die set 69A to be loaded therein (process block 134). In particular, in some embodiments, the first die seat 67A may be implemented in the first die plate 126 such that, when the first die set 69A is loaded therein, the first die set 69A opens toward the grab plate 58 of the swage machine 38.

Furthermore, in some embodiments, the first die plate 126 of the swage machine 38 may be implemented at least in part using metal, such as carbon steel, stainless steel, duplex stainless steel, and/or super duplex stainless steel. Thus, in some such embodiments, the first die seat 67A may be implementing in the first die plate 126 at least in part by milling (e.g., removing material from) the first die plate 126, for example, after an initial manufacturing process. However, in other embodiments, the first die seat 67A may be implemented at least in part by molding (e.g., deforming) the first die seat 67A into the first die plate 126, for example, during an initial manufacturing process.

In addition to the first die plate 126, as described above, the swage machine 38 may include a second (e.g., subsequent) die plate 128, which is implemented farther from the grab plate 58 of the swage machine 38 and with a second die seat 67B that enables a second (e.g., subsequent) die set 69B to be loaded therein, for example, while the first die set 69A is concurrently loaded in the first die plate 126. As such, implementing the swage machine 38 may include implementing a second die plate 128 with a second die seat 67B that enables a second die set 69B to be loaded therein (process block 136). In particular, in some embodiments, the second die seat 67B may be implemented in the second die plate 128 such that, when the second die set 69B is loaded therein, the second die set 69B opens toward the grab plate 58 of the swage machine 38.

Additionally, in some embodiments, the second die plate 128 of the swage machine 38 may be implemented at least in part using metal, such as carbon steel, stainless steel, duplex stainless steel, and/or super duplex stainless steel. Thus, in some such embodiments, the second die seat 67B may be implementing in the second die plate 128 at least in part by milling (e.g., removing material from) the second die plate 128, for example, after an initial manufacturing process. However, in other embodiments, the second die seat 67B may be implemented at least in part by molding (e.g., deforming) the second die seat 67B into the second die plate 128, for example, during an initial manufacturing process.

Furthermore, to enable a die plate 60 of a swage machine 38 to be moved toward the grab plate 58 of the swage machine 38 and/or moved away from the grab plate 58 of the swage machine 38, as described above, the swage machine 38 may include a support plate 90 in addition to its grab plate 58 and its die plates 60. As such, implementing the swage machine 38 may include implementing a support plate 90, for example, at least in part using metal, such as carbon steel, stainless steel, duplex stainless steel, and/or super duplex stainless steel (process block 138). In particular, in some embodiments, the support plate 90 of the swage machine 38 may be implemented such that the die plates 60 of the swage machine 38 are each disposed between the support plate 90 and the grab plate 58 of the swage machine 38.

Furthermore, as described above, a swage machine 38 may include one or more support rods 92 including a first support rod 92A that are each secured to the grab plate 60 and the support plate 90 of the swage machine 38 such that it extends through the first die plate 126 of the swage machine 38, for example, to enable the first die plate 126 to slide in an axial direction 72 between the grab plate 60 and the support plate 90. As such, implementing the swage machine 38 may include securing a first support rod 92A to (e.g., between) its grab plate 60 and its support plate 90 such that the first support rod 92A extends through the first die plate 126 (process block 140). In some embodiments, the first support rod 92A may be implemented at least in part using metal, such as carbon steel, stainless steel, duplex stainless steel, and/or super duplex stainless steel Moreover, to facilitate actuating (e.g., moving) its first die plate 126 in an axial direction 72, as described above, a swage machine 38 may include one or more swaging actuators 64 including a first swaging actuator 64A that are each secured to its first die plate 126 and its support plate 90. As such, implementing the swage machine 38 may include securing a first swaging actuator 64A to (e.g., between) the first die plate 126 and the support plate 90 of the swage machine 38 (process block 142). In particular, in some embodiments, the actuator cylinder 76 of the first swaging actuator 64A may be secured to the support plate 90 and the actuator piston 78 of the first swaging actuator 64A may be secured to the first die plate 126 or vice versa, for example, to enable the swage machine 38 to perform a swaging operation (e.g., pass) using a first die set 69 loaded in the first die plate 126 at least in part by operating the first swaging actuator 64A to push the first die plate 126 toward the grab plate 58.

Additionally, as described above, a swage machine 38 may include one or more support rods 92 including a second support rod 92B that are each secured to the grab plate 60 and the support plate 90 of the swage machine 38 such that it extends through the second die plate 128 of the swage machine as well as the first die plate 126 of the swage machine 38, for example, to enable the second die plate 128 to slide in an axial direction 72 between the grab plate 60 and the support plate 90. As such, implementing the swage machine 38 may include securing a second support rod 92B to (e.g., between) its grab plate 60 and its support plate 90 such that the second support rod 92B extends through its first die plate 126 and its second die plate 128 (process block 144). In some embodiments, the second support rod 92B may be implemented at least in part using metal, such as carbon steel, stainless steel, duplex stainless steel, and/or super duplex stainless steel.

Additionally, to facilitate actuating (e.g., moving) its second die plate 128 in an axial direction 72, as described above, a swage machine 38 may include one or more swaging actuators 64 including a second swaging actuator 64B that are each secured to its second die plate 128 and its support plate 90. As such, implementing the swage machine 38 may include securing a second swaging actuator 64B to (e.g., between) the second die plate 128 and the support plate 90 of the swage machine 38 (process block 146). In particular, in some embodiments, the actuator cylinder 76 of the second swaging actuator 64B may be secured to the support plate 90 and the actuator piston 78 of the second swaging actuator 64B may be secured to the second die plate 128 or vice versa, for example, to enable the swage machine 38 to perform a swaging operation (e.g., pass) using a second die set 69B loaded in the second die plate 128 at least in part by operating the second swaging actuator 64B to push the second die plate 128 toward the grab plate 58. In this manner, the present disclosure provides techniques for implementing a swage machine 38 that enables multiple different die sets 69 to be concurrently loaded therein and, thus, used while the swage machine 38 operates to perform one or more swaging operations (e.g., passes) in a swaging process.

Figure 13:
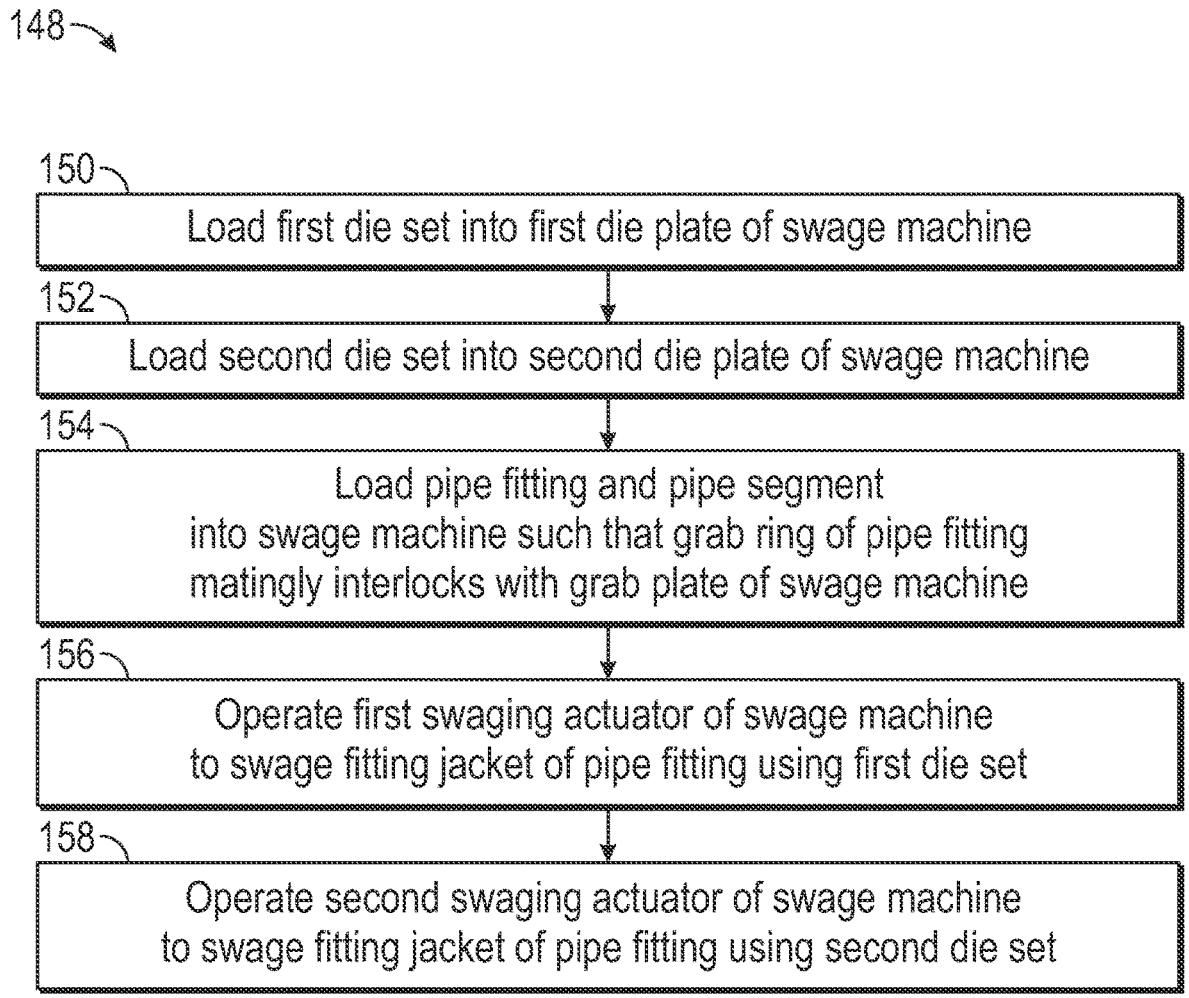
FIG. 13 is a flow diagram of an example of a process for operating a swage machine that includes multiple die plates, in accordance with an embodiment of the present disclosure.

To help further illustrate, another example of a process 148 for operating a swage machine 38 is described in FIG. 13. Generally, the process 148 includes loading a first die set into a first die plate of a swage machine (process block 150), loading a second die set into a second die plate of the swage machine (process block 152), and loading a pipe fitting and a pipe segment into the swage machine such that a grab ring of the pipe fitting matingly interlocks with the grab plate of the swage machine (process block 154). Additionally, the process 148 generally includes operating a first swaging actuator of the swage machine to swage a fitting jacket of the pipe fitting using the first die set (process block 156) and operating a second swaging actuator of the swage machine to swage the fitting jacket of the pipe fitting using the second die set (process block 158).

Although described in a specific order, which corresponds with an embodiment of the present disclosure, it should be appreciated that the example process 148 is merely intended to be illustrative and not limiting. In particular, in other embodiments, a process 148 for operating a swage machine 38 may include one or more additional process blocks and/or omit one or more of the depicted process blocks. Additionally or alternatively, in other embodiments, one or more of the depicted process blocks may be performed in a different order, for example, such that the second (e.g., subsequent) die set is loaded in the second die plate before the first (e.g., preceding) die set is loaded in the first die plate.

In any case, as described above, to enable multiple different die sets 69 to be concurrently loaded therein, a swage machine 38 may include multiple die plates 60 that each includes one or more die seats 67. In particular, the swage machine 38 may include a first (e.g., preceding) die plate 126 that implemented closer to the grab plate 58 of the swage machine 38 and with a first die seat 67A that enables a first (e.g., preceding) die set 69A, which is to be used during one or more swaging operations (e.g., passes), to be loaded therein. As such, operating the swage machine 38 may including loading a first die set 69A into a first die seat 67A that is implemented in the first die plate 126 of the swage machine 38, for example, such that the first die set 69A opens toward the grab plate 58 of the swage machine 38 (process block 150). In particular, in some embodiments, the first die set 69A may be loaded in the die plate 60 such that an outer surface of the first die set 69A directly abuts an inner surface of the first die seat 67A.

In addition to a first die plate 126, as described above, a swage machine 38 may include a second (e.g., subsequent) die plate 128 that is implemented farther from the grab plate 58 of the swage machine 38 and with a second die seat 67B that enables a second (e.g., subsequent) die set 69B, which is to be used during one or more swaging operations (e.g., passes), to be loaded therein. As such, operating the swage machine 38 may include loading a second die set 69B into a second die seat 67B that is implemented in the second die plate 128 of the swage machine 38, for example, such that the second die set 69B opens toward the grab plate 58 of the swage machine 38 (process block 152). In particular, in some embodiments, the second die set 69B may be loaded in the die plate 60 such that an outer surface of the second die set 69B directly abuts an inner surface of the second die seat 67B.

Furthermore, as described above, a swage machine 38 may include a grab plate 58 with a grab tab 66, which is implemented (e.g., sized and/or shaped) to matingly interlock with a grab notch 68 on a grab ring 46 of a pipe fitting 18 that is to be swaged by the swage machine 38. Additionally, as described above, a pipe fitting 18 may be secured to a pipe segment 20 at least in part by operating a swage machine 38 to conformally deform a fitting jacket 50 of the pipe fitting 18 around the tubing 22 of the pipe segment 20. As such, operating the swage machine 38 may include loading a pipe fitting 18 and a pipe segment 20 to be secured thereto into the swage machine 38 such that the grab notch 68 on the grab ring 46 of the pipe fitting 18 matingly interlocks with the grab tab 66 on the grab plate 58 of the swage machine 38 (process block 154).

Moreover, as described above, a swage machine 38 may then perform a swaging operation at least in part by operating its swaging actuators 64 to cause multiple different die sets 69 loaded therein to pass over a fitting jacket 50 of a pipe fitting 18 that is secured thereto. In particular, as described above, the swage machine 38 may include a first swaging actuator 64A that is secured to (e.g., between) its first die plate 126 and its support plate 90. As such, to swage the fitting jacket 50 using the first die set 69A that is loaded in the first die plate 126, the first swaging actuator 64A may be operated to push the first die plate 126 over the fitting jacket 50 in an axial direction 72 toward the grab plate 58.

Additionally, as described above, the swage machine 38 may include a second swaging actuator 64B that is secured to (e.g., between) its second die plate 128 and its support plate 90. As such, to swage the fitting jacket 50 using the second die set 69B that is loaded in the second die plate 128, the second swaging actuator 64B may be operated to push the second die plate 128 over the fitting jacket 50 in an axial direction 72 toward the grab plate 58. In this manner, the present disclosure provides techniques for implementing and/or operating special-purpose deployment equipment—namely a swage machine—that enables multiple different dies sets to be concurrently loaded therein, which, at least in some instances, may facilitate improving the efficiency with which the swage machine secures a pipe fitting to a pipe segment and, thus, deployment efficiency of a pipeline system in which the pipe fitting and the pipe segment are to be deployed, for example, at least in part by obviating a pause between success swaging passes in a swaging process to swap out die sets.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:
1. A system comprising:
   a pipe fitting configured to be secured to a pipe segment, wherein the pipe fitting comprises a fitting jacket configured to be conformally deformed around tubing of the pipe segment that defines a pipe bore and a fluid conduit implemented in a tubing annulus of the tubing to facilitate securing the pipe fitting to the pipe segment; and a swage machine, wherein the swage machine comprises:
- a grab plate with a grab tab, wherein the grab tab is configured to matingly interlock with a grab notch on a grab ring of the pipe fitting to facilitate securing the swage machine to the pipe fitting;
- a first die seat implemented in a die plate of the swage machine;
- a first die set loaded in the first die seat of the swage machine, wherein the first die set is configured to be passed over the fitting jacket of the pipe fitting to facilitate conformally deforming the fitting jacket around the tubing of the pipe segment;
- a second die seat implemented farther from the grab plate of the swage machine than the first die seat; and
- a second die set loaded in the second die seat of the swage machine, wherein the second die set is different from the first die set and is configured to be passed over the fitting jacket of the pipe fitting to facilitate conformally deforming the fitting jacket around the tubing of the pipe segment.

2. The system of claim 1, wherein the swage machine comprises a swaging actuator that is:
- secured to the die plate of the swage machine; and
- configured to facilitate conformally deforming the fitting jacket of the pipe fitting around the tubing of the pipe segment at least in part by causing the die plate and the grab plate of the swage machine to move toward one another.

3. The system of claim 2, wherein the swage machine comprises:
- another die plate that comprises the second die seat; and
- another swaging actuator that is secured to the other die plate of the swage machine, wherein the another swaging actuator is configured to facilitate conformally deforming the fitting jacket of the pipe fitting around the tubing of the pipe segment at least in part by causing the other die plate and the grab plate of the swage machine to move toward one another.

4. The system of claim 3, wherein the swage machine comprises:
- a support plate, wherein:
  - the die plate and the another die plate of the swage machine are disposed between the support plate and the grab plate of the swage machine;
  - the swaging actuator of the swage machine is secured to the support plate and the die plate of the swage machine; and
  - the another swaging actuator of the swage machine is secured to the support plate and the other die plate of the swage machine;
- a first support rod secured to the grab plate and the support plate of the swage machine such that the first support rod extends through the die plate of the swage machine to enable the die plate to slide between the grab plate and the support plate; and
- a second support rod secured to the grab plate and the support plate of the swage machine such that the second support rod extends through the another die plate of the swage machine to enable the other die plate to slide between the grab plate and the support plate.

5. The system of claim 2, wherein the second die seat is implemented in the die plate of the swage machine.

6. The system of claim 1, wherein:
- the first die set of the swage machine is configured to have a first ending inner surface diameter when the first die set is loaded in the first die seat of the swage machine such that a first outer surface of the first die set directly abuts a first inner surface of the first die seat; and
- the second die set of the swage machine is configured to have a second ending inner surface diameter that is smaller than the first ending inner surface diameter of the first die set when the second die set is loaded in the second die seat of the swage machine such that a second outer surface of the second die set directly abuts a second inner surface of the second die seat.

7. The system of claim 6, wherein the second die set is configured to have a starting inner surface diameter that is greater than the first ending inner surface diameter of the first die set when the second die set is loaded in the second die seat of the swage machine such that the second outer surface of the second die set directly abuts the second inner surface of the second die seat to facilitate producing a relief section at a junction between the first die set and the second die set that enables the fitting jacket of the pipe fitting to expand outwardly after the fitting jacket passes the first die set.

8. The system of claim 1, wherein:
- the first die set of the swage machine is configured to have a first ending inner surface diameter when the first die set is loaded in the first die seat of the swage machine such that a first outer surface of the first die set directly abuts a first inner surface of the first die seat; and
- the second die set of the swage machine is configured to have a second ending inner surface diameter that is not smaller than the first ending inner surface diameter of the first die set when the second die set is loaded in the second die seat of the swage machine such that a second outer surface of the second die set directly abuts a second inner surface of the second die seat.

9. The system of claim 8, wherein:
- the swage machine comprises:
  - a wedged activation collar, wherein the wedged activation collar comprises a female taper configured to be selectively inserted between a male taper of the second die set and the second die seat of the swage machine; and
  - one or more collar actuators secured to the wedged activation collar, wherein the one or more collar actuators are configured to selective insert the wedged activation collar between the second die set and the second die seat, selectively withdraw the wedged activation collar out from between the second die set and the second die seat, or both; and
- the second die set of the swage machine is configured to have a third ending inner surface diameter that is smaller than the first ending inner surface diameter of the first die set when the wedged activation collar is inserted between the second die set and the second die seat such that the second outer surface of the second die set does not directly abut the second inner surface of the second die set.

10. A system comprising a swage machine, wherein the swage machine comprises:
- a grab plate with a grab tab, wherein the grab tab is configured to matingly interlock with a grab notch on a grab ring of a pipe fitting to be swaged by the swage machine to facilitate securing the swage machine to the pipe fitting;

a preceding die seat implemented in a die plate of the swage machine, wherein the preceding die seat is configured to enable a preceding die set that is to be used to facilitate swaging the pipe fitting to be loaded in the swage machine such that a first outer surface of the preceding die set directly abuts a first inner surface of the preceding die seat;

a subsequent die seat configured to enable a subsequent die set that is to be used to facilitate swaging the pipe fitting to be loaded in the swage machine such that a second outer surface of the subsequent die set directly abuts a second inner surface of the subsequent die seat while the preceding die set is concurrently loaded in the preceding die seat of the swage machine, wherein the preceding die seat is implemented closer to the grab plate of the swage machine than the subsequent die seat; and a swaging actuator secured to the die plate of the swage machine, wherein the swage machine is configured to swage the pipe fitting at least in part by operating the swaging actuator to cause the die plate and the grab plate of the swage machine to move toward one another.

11. The system of claim 10, wherein:

the preceding die seat of the swage machine is configured to cause the preceding die set to have a first ending inner surface diameter when the preceding die set is loaded in the preceding die seat such that the first outer surface of the preceding die set directly abuts the first inner surface of the preceding die seat; and when the subsequent die set is loaded in the subsequent die seat of the swage machine such that the second outer surface of the subsequent die set directly abuts the second inner surface of the subsequent die seat, the subsequent die seat is configured to:

cause the subsequent die set to have a second ending inner surface diameter that is smaller than the first ending inner surface diameter of the preceding die set; and cause the subsequent die set to have a starting inner surface diameter that is larger than the first ending inner surface diameter of the preceding die set.

12. The system of claim 10, wherein the swage machine comprises another swaging actuator secured to another die plate of the swage machine, wherein:

the subsequent die seat is implemented in the another die plate of the swage machine; and the swage machine is configured to swage the pipe fitting at least in part by operating the another swaging actuator to cause the another die plate and the grab plate of the swage machine to move toward one another.

13. The system of claim 10, wherein the swage machine comprises a wedged activation assembly, wherein the wedged activation assembly comprises:

a wedged activation collar having a female taper; and a collar actuator secured to the wedged activation collar, wherein:

the subsequent die set is configured to have a first ending inner surface diameter when the second outer surface of the subsequent die set directly abuts the second inner surface of the subsequent die seat; and the subsequent die set is configured to have a second ending inner surface diameter that is less than the first ending inner surface diameter when the wedged activation collar is at least partially inserted between the subsequent die set and the subsequent die seat.

\* \* \* \* \*